US008214325B2

(12) United States Patent
Navas

(10) Patent No.: US 8,214,325 B2
(45) Date of Patent: Jul. 3, 2012

(54) FEDERATING BUSINESS EVENT DATA WITHIN AN ENTERPRISE NETWORK

(75) Inventor: Julio Navas, Concord, CA (US)

(73) Assignee: SAP AG, Walldorf (DE)

( * ) Notice: Subject to any disclaimer, the term of this patent is extended or adjusted under 35 U.S.C. 154(b) by 218 days.

(21) Appl. No.: 12/622,383

(22) Filed: Nov. 19, 2009

(65) Prior Publication Data

US 2010/0125545 A1   May 20, 2010

Related U.S. Application Data

(60) Provisional application No. 61/116,622, filed on Nov. 20, 2008.

(51) Int. Cl.
*G06F 17/00* (2006.01)
(52) U.S. Cl. ...................................................... 707/602
(58) Field of Classification Search .................. 707/602, 707/607, 608, 609, 648, 705, 821
See application file for complete search history.

(56) References Cited

U.S. PATENT DOCUMENTS

| 6,931,392 | B1 * | 8/2005 | Skeen | 1/1 |
| 7,383,255 | B2 | 6/2008 | Desai et al. | |
| 2008/0033958 | A1 | 2/2008 | Richards et al. | |

OTHER PUBLICATIONS

European Search Report for European Application No. 09014493.2 Mailed Mar. 17, 2010, 9 pages.
Non-Final Office Action for U.S. Appl. No. 12/622,396, Mailed Oct. 26, 2011.
Non-Final Office Action for U.S. Appl. No. 12/622,387, Mailed Jan. 5, 2012.
Cohen, et al., "Descriptive Naming of Context Data Providers", 2005 Context, pp. 112-125.
Langegger, Andreas et al., "Sharing Data on the Grid using Ontologies and distributed SPARQL Queries", Database and expert systems application, 2007. 18th International conference, IEEE, Piscataway, NJ, USA, Sep. 1, 2001, 5 Pages.
Moy, John T., "Multicast Extensions to OSPF", Request for Comments 1584 (rfc1584). Mar. 1994; downloaded on Mar. 17, 2009 from http://wwwrfc-editor.org/rfc/rfc1584.txt, 51 pages.
Moy, John T., "OSPF Version 2", RFC 2328 (rfc2328). The Internet Engineering Task Force, 48377 Fremont Blvd. Suite 117, Fremont, CA 94538, USA, Apr. 1998; downloaded on Mar. 17, 2009 from http://rfc.dotsrc.org/rfc2328.html, 246 pages.
Thuraisingham, Bhavani , et al, "Design and Implementation of a Distributed Database Inference Controller", Proceedings of the annual international computer software and applications Conference, Phoenix, Nov. 1-5, 1993; Los Alamitos, IEEE Comp. Soc. Press, US, vol. Conf. 17, Nov. 1, 1993, 7 Pages.

* cited by examiner

*Primary Examiner* — Fred I Ehichioya
(74) *Attorney, Agent, or Firm* — Blakely Sokoloff Taylor & Zafman LLP

(57) ABSTRACT

Parsing of event queries in an enterprise system is described. The enterprise system receives queries, which are broken down into query components. The query components each represent segments of the query. The enterprise system identifies sources of event data and sends queries towards the sources of the event data. The query components are processed close to the data source. The responses are combined to generate an event query response that indicates the event data of each of the query components.

23 Claims, 13 Drawing Sheets

FEDERATING BUSINESS EVENT DATA WITHIN AN ENTERPRISE NETWORK

RELATED APPLICATIONS

This application is based on U.S. Provisional Application 61/116,622 filed Nov. 20, 2008, and claims the benefit of priority of that provisional application. Furthermore, the provisional application is hereby incorporated by reference.

This application is related to U.S. patent application Ser. No. 12/622,396, entitled, "Stream Sharing for Event Data within an Enterprise Network," having common inventorship, and filed concurrently herewith.

FIELD

The invention is generally related to data access management, and more particularly to selectively parsing and federating queries related to business event data in an enterprise network.

COPYRIGHT NOTICE/PERMISSION

A portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2009, SAP AG, All Rights Reserved.

BACKGROUND

Consider an enterprise having multiple systems and potentially multiple geographic locations. Each transaction of the enterprise with an external entity, and many operations within the enterprise on data and/or systems, generates data. The data may indicate changes in inventory, information about sales and customer relations, etc. Data is generally associated with data objects, and frequently, business objects or data objects having a business context. The change to data associated with one or more objects (e.g., business objects or other objects) is referred to herein as an event. Enterprises generally need to keep track of the events, process the generated data (as may be indicated by the event), and make decisions based on the event. Traditionally, enterprises store events in operational databases (operational data stores) among many sub-systems within the enterprise, which may include subsystems that are hosted on separate machines, and may be geographically separated. An example of geographic separation of subsystems may be a system local to production plant in one city, and a system local to a distribution plant that could be in a different region, different state, different country, or different continent. There is generally a problem within enterprises, especially as the enterprise grows and as business expands geographically, where the enterprise has "too much" data and "too many" systems. While it is understood that "too much" and "too many" are relative terms, the general problem is that the amount of resources required to handle the data and the systems is higher than the enterprise is capable of providing or is willing to provide. When there is too much data and too many systems, the enterprise loses operational data visibility across the enterprise, and any process for handling events becomes very time consuming and expensive.

For example, consider a business that has more than 100 different enterprise systems located in various locations throughout the world. The data is gathered and stored in an operational database, e.g., an online transaction processing (OLTP) database. If someone within the business wanted to answer a question based on the operational data, or the data generated as events, creating a new operational report may not be a possibility. In research on the subject, it was found that in certain cases, such an operational report cannot be created in less than 6 months. The business traditionally has to search multiple stacks to extract and transform the data before creating an operational report. The searching, extracting, and transforming would need to be repeated for each of the different systems in place, which would require the use of many people and systems. Thus, such an operational report is not even considered a possibility because of the inability to access and transform the data in a cost-effective manner.

In general, it has been found that businesses do not have tools that are specific to operational data. As mentioned above, the operational data only exists as an interim state of data that is then stored in data warehouses and a centralized database to hold the operational data store. Use of the data has then required a great deal of programming around the database to make the data accessible.

Thus, event data within and outside an enterprise has been inaccessible except through a vast amount of enterprise time and cost to analyze and report on the data. The vast amounts of time and cost make the data generally inaccessible to information workers within the enterprise.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
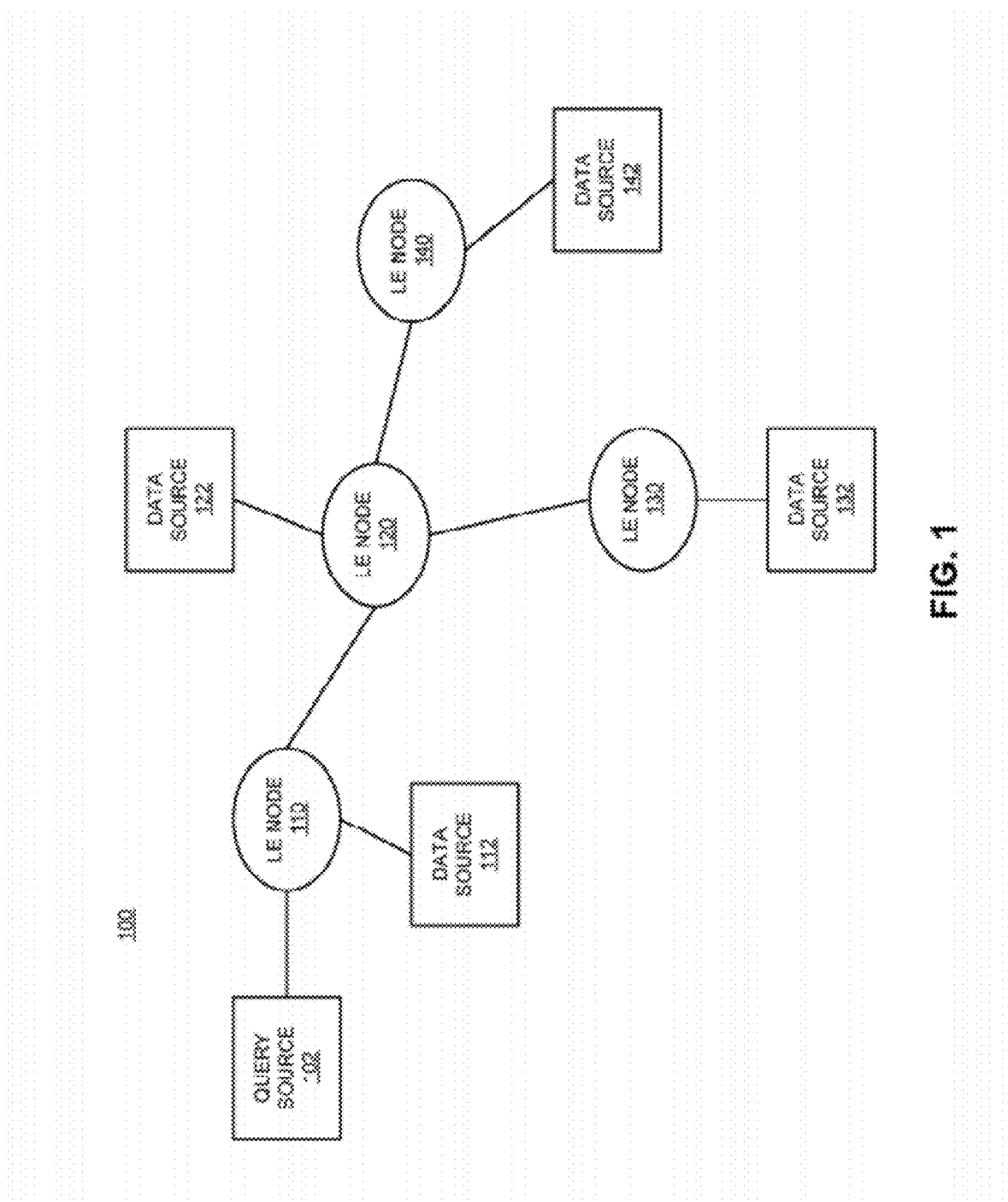
FIG. 1 is a block diagram of an embodiment of an enterprise system that supports federation of real-time event data.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

An enterprise system includes multiple data sources that generate data that may be associated with an event in the enterprise system. Real-time and non real-time event data may be obtained from the data sources via query. A query is generated at a client device and propagated through the enterprise network to the data source. The query may be parsed into component parts, and each component part is sent toward an enterprise node coupled to a data source that generates the event data associated with the component part of the query. An enterprise node "coupled" to a data source may refer to being directly coupled or located at the same node. "Coupled" may also be understood in some instances as connected. Based on routing information and data advertising by the data source, each node (including nodes that receive queries) may have information about what data is available or accessible through other nodes in the enterprise network.

In one embodiment, the enterprise system identifies query components that are related to identical or common event information from a data source of the enterprise, and merges the queries. Thus, the enterprise system can send a single query to the data source for the event information, receive the response, and send the response to the query sources. Note that the queries are sent to the source of the event data, or to an enterprise node coupled to the source, and are responded to with event data, at least a part of which can be real-time event data. Data from a data warehouse or data store may also be returned in response to a query in addition to the real-time event data. Contrast such an approach with current data warehousing and querying a repository of information.

The enterprise system that supports the event query processing as described herein may be referred to as an "eventing" system or event network. It will be understood that different terminology may be used, and an eventing system could more specifically be implemented as a "business event network" that handles queries and data sources related to business events with changes to business objects and business processes. The general concept of an eventing system is a system that resides on top of an enterprise system that allows the system to provide greater understanding of the data within the enterprise system. The eventing system in particular allows access to operational or real-time event data, and performing of actions based on the events (e.g., performing an operation on a returned data object). For purposes of description herein, and not by way of limitation, such a system is referred to below as a "Live Enterprise" (LE) system. The teachings herein will be understood as being applicable to any similar event network that accesses real-time data and/or sends queries towards data sources, or otherwise handles queries as described.

As used herein, operational or real-time event data refers to data that is substantially newly generated within the enterprise system. Newly generated data is data that is newer than data that would generally be warehoused in the enterprise system. Thus, operational or real-time data is data that has not yet been warehoused in a database, and/or is not subject to standard data query mechanisms. Non-real-time data, or data that is stored in a data warehouse or database can also be accessed in response to a query. Non real-time data can also be referred to as historical data. The LE system can thus access and provide event information, whether real-time or non-real-time in response to queries.

An enterprise system refers to the network of computers and interconnection equipment within a company or organization. The enterprise system includes software components such as the servers and management systems. Each element of hardware and software within the enterprise system may be referred to as a subsystem, or simply "system" (thus, the enterprise system may be considered a system of systems). The enterprise system as described herein includes data sources. The data sources may be any subsystem (e.g., supply chain management (SCM), enterprise resource planning (ERP), human resources, customer relations management (CRM), information technology (IT), etc.), database, or other element within the enterprise that implements a change to one or more objects (e.g., structured objects, including business objects that generally are part of a business context such as a "Customer" object). Each change to an object may be referred to as an event.

In one embodiment, as described herein, an enterprise system includes query processing entities within the network. The query processing entities may be software and/or hardware components within the enterprise network. The query processing entities receive and process requests for the event data. The query processing entities parse or separate user queries into component parts and send the component parts to the data sources that have the requested information. The routing of event queries for real-time event data is described in more detail in related application Ser. No. 12/622,387, entitled, "Intelligent Business Event Query Publish and Subscribe System," having common inventorship, and filed concurrently herewith.

In response to the queries, in one embodiment, the data sources provide a response to the query processing entities, which then return results to the query source. Note that the query components may be provided to enterprise nodes directly coupled to the data sources, but for simplicity in explanation, the description herein may refer simply to sending a query to a data source. Sending a query to a data source may include sending the query to a next hop on a path towards a data source, as indicated by routing tables, routing indexes, etc., based on what data the data source is advertised throughout the network as providing. Note also that results may be partial results from query components. Thus, to provide a complete result, in one embodiment the query processing entity compiles the query component responses to generate a complete query response to send to the query source. In an alternative embodiment, the query processing entity returns all query responses to the query sources, and each query source may include an agent to compile the component query results into a complete query response. The composite of the responses to the query components may be referred to as a event, which is described in more detail below. In one embodiment, a returned event includes an object, or an instance of an object, that has particular data and actions associated with it. Operation on the actions can result in changes within the enterprise system. One or more enterprise services enable interaction with the event.

FIG. 1 is a block diagram of an embodiment of an enterprise system that supports federation of real-time event data.

Enterprise network 100 illustrates a network of nodes within the enterprise. The nodes illustrated are enabled for query processing as described herein. For purposes of description, such nodes will be referred to as "Live Enterprise" (LE) nodes. It will be understood that other labels/designators could be used to identify enterprise nodes that process queries as described herein to provide access to real-time event data. LE nodes 110, 120, 130, and 140 are not constrained to a particular network architecture or physical layout. Rather, the LE nodes may be geographically separated or at the same geographic location, have the same or different network connection types as each other, and may be connected via private and/or public networks. In one embodiment, different nodes are in different enterprise networks, such as business partners or other cooperative networks. Thus, the nodes need not be all within the same physical network, and need not be within the same enterprise.

Query source 102 represents a client device that connects with enterprise network 100. Thus, query source may be a laptop or desktop computer, a handheld device (e.g., a networked phone or other device), or any other type of device that allows a user to interact with enterprise network 100. The form of the query is described in more detail below. The query source has hardware components and user interface and software components.

Each node 110, 120, 130, and 140 is illustrated with an associated data source 112, 122, 132, and 142, respectively. Each node may have zero or more associated data sources. Each data source is an event producer. An event producer is a source of events that may be of interest to someone within the enterprise (e.g., the user of query source 102). Events include any type of transaction or system operation change, such as an inventory level dropping below a threshold, the occurrence of a threshold number of faults within a system, etc.). Each data source 112, 122, 132, 142 generates event data as business is conducted and transactions occur. In one embodiment, these data sources generate real-time event data. In one embodiment, the event producer enriches situation-specific information (such as an inventory level drop) with attributes and contextual data related to the specific situation. By enriching such information, an event producer can create an instance of an event that can be independently processed by other entities in the enterprise, through other entities that can process query information as described herein. The combination of all query processing entities may be referred to, as an example, as a Live Enterprise architecture, which may include event producers, event brokers (e.g., entities that can route queries, access event information, and return query responses), and event consumers (e.g., the query source). In one embodiment, the LE architecture is incorporated into an enterprise system available from SAP AG, of Walldorf Germany. Subsystems available under the SAP enterprise system include MySAP ERP (enterprise resource planning), CRM (customer relationship management), SCM (supply chain management), and SAP B1 (One, an ERP system directed to small and medium sized enterprises). Additionally, the LE architecture could be incorporated into an enterprise system that includes non-SAP systems and/or RFID (radio frequency identifier) systems.

As mentioned above, each data source 112, 122, 132, and 142 may represent one or more subsystems that generate event data. The data sources at a single node need not be of the same type. Thus, for example, any number of different systems could each produce event data, such as an ERP system, a database interface system, a CRM system, etc., as well as providing real-time or non real-time data. Thus, each data source could be one or more of a CRM system, an ERP system, a database, a flat file, etc. The CRM and ERP systems may generate real-time data, while databases and flat files represent examples of historical data warehouses. In one embodiment, the event producer represented by the data sources publishes or makes available all event data. Alternatively, the event producer may internally filter events and determine which events should be notified externally through a determination algorithm. Such a determination algorithm could be rules-based as to event type, event significance, etc., and data satisfying the determination will be considered information to share externally. Each data source can be considered to have a relationship with the events it produces. Thus, the event is associated with a data source, in contrast to a event being associated with an application that consumes the event, as with current systems.

Each LE node 110, 120, 130, and 140 represents an event broker, and the interconnection/networking of the nodes can be considered an event bus. Each node is an LE node because there are components local to each node that enables the node to participate in the LE network, processing and routing event data as described herein. Each node is an event broker because it is a node coupled to a data source, and can thus receive and process query components for the event data of the associated source. The event broker can exist on a "platform," such as an enterprise system that is leveraged to exchange query information. Examples of an event broker platform may be software designed to facilitate the exchange of information amongst a plurality of an enterprise's systems, such as SAP XI. In one embodiment, the event bus components may be understood as logical entities in enterprise network 100 to facilitate the transmission and propagation of messages and events between clients, as well as enterprise services to manage event metadata and context. Each LE node as an event broker is at the same time a target and a source of the events. Nodes 110, 120, 130, and 140 filter, aggregate, and manage the distribution of events received from the data sources 112, 122, 132, and 142 (the event producers) to query source 102 (an event consumer).

In one embodiment, a query may be considered a "real-time" query that, may, for example exist before the event information exists. The system may return results for the query as soon as the information does exist. Another example is a continuous query that persists in monitoring a data source until termination criteria are met (e.g., a certain number of results, a certain number of days, a particular event is returned). Thus, a user of query source 102 may subscribe to particular events, or define certain events that are of interest to the user. Event information can also be queried as would normally be understood, by a user generating a query that is then sent out. However, some queries may be "standing queries" that represent monitoring of events within the enterprise. Such standing queries may be patterns of occurrences or events that would be of interest. Consider that query source 102 specifies interest in particular events by subscribing to the events. LE node 110 as the broker works seamlessly behind the scenes to expose query source 102 only to the events related to the specified events. Therefore, the event broker provides the ability to publish, route, orchestrate, and consume events via a reliable, highly available enterprise-services enabled technology platform. Context based intelligence may be incorporated into these processes via a rules engine. A rules engine at the data sources can filter what information to make available, and a rules engine at the LE nodes can filter what information to send to the query source.

As suggested above, the event data may be available through a publish-subscribe mechanism. A subscription is a unidirectional relationship between two endpoints where one endpoint, acting as a subscriber, pulls data feeds from the other endpoint (which acts as a publisher). The data sources, as publishers, make event data available, and may indicate the types of information available to subscribe to. Publishing may be propagated from the data source to nodes in the enterprise network. Thus, the publishing can be considered to advertise the data and e.g., the events, available from the data source. The query source, as a subscriber, receives event data from the data sources based on the subscription. A subscription can define the exact type and the conditions under which the events should be notified to the query source. The LE nodes manage the distribution of events received from the data sources to the query source. In one embodiment, the LE nodes are enabled to aggregate event query data. For aggregation of events, the LE nodes correlate various events which may appear in any order and at different points of time.

The LE nodes have an understanding through rules, logic, or code of the format in which a query source can receive event data. Thus, event data produced by a data source may be of a format that is inconsistent with the system through which the query was generated, or incompatible with the format expected by the user. In one embodiment, the LE node through which the query source accesses the enterprise network stores information that indicates the formatting of the query source. Thus, the LE node may transform or modify received event data for consumption by the query source. The LE nodes provide connectivity to underlying enterprise systems, and link to metadata definitions of events. The LE nodes may also translate events to the format required by underlying systems where actions are to be performed.

As mentioned above, query source 102 provides an example of an event consumer. Note that in this sense there may be a merging of terminology. Technically, a user interface (UI) component executing on a client device can be considered an event consumer. However, the device as the client executing the UI, and/or the user that requests the information can also be considered the event consumer for purposes of simplicity in description herein. A user represents the entity that acts upon received event information. Acting upon a event may involve interaction with the event producer (i.e., the underlying system or systems that generated the data), the event broker (the LE nodes), or other systems. To act on a event, the user may need to obtain event context, such as context derivable from master data within the enterprise system. Master data is understood to be data stored and accessible centrally within the enterprise. Instead of a human user, the user may be automated system, such as an application with built-in logic to consume and act upon the received events.

As mentioned above, in one embodiment, "interest" in data may be indicated through a subscription by the user, or otherwise selecting to receive advertised data. Alternatively, interest in data may be automatically deduced based on a role of the user (e.g., all vice presidents (VPs) receive certain information, all project managers receive other event information related to the particular project, etc.). For scalability, the LE architecture can enable distributed parallel processing across multiple local event routers. In one embodiment, event routing uses a push (as opposed to a pull) mechanism.

A user can perform actions based on the event data. In one embodiment, a user can create an event execution node by interacting with the LE system, which interacting may include personalizing a new event. The creating of the event execution node is a separate computer process from the obtaining the event data. The creating of the event execution node is dedicated to detecting a single higher-level event through the correlation of information from multiple different sources or event streams. Once the event is detected, the LE system (through the LE nodes) can enrich a event through predetermined data access calls, cause changes to occur in underlying systems, push information to the user in a selected or preferred channel (e.g., SMS to a cell phone, email, etc.), or publish one or more event streams of its own.

In one embodiment, each LE node may include a rendezvous point, which is a distributed metadata repository. The distributed metadata repository can be operable in indexing event data within the enterprise. Items within the metadata repository may include publishable event definitions for common event definitions across the enterprise, data source definitions to indicate what information is available where in the enterprise network, and security access lists or other row level filters for restricting query access based on security features of the LE system. In one embodiment, such a rendezvous point is accessible through a web-service or enterprise service interface. The web service interface enables users to draft their own event definitions and search for one or more desired system-level event definitions, enables user or applications to use a standard interface to create event execution nodes based on a description of the desired event and the subsequent response actions, and enables users or applications to enrich event detection by asking queries through the web-service interface. The queries access information from multiple data sources throughout the enterprise, and return a response that would appear as if it were from a single unified data source. In one embodiment, the rendezvous point is centralized rather than distributed.

As a general description of the Eventing System or LE system described herein, the eventing system automates processes for finding and extracting data within an enterprise that is relevant for particular individuals and/or particular actions. Such a system permits scaling to large numbers of servers and locations in a parallel execution, and with consistent definition of events across the enterprise. The LE system also enables real-time push of information to users, as contrasted to data cache/pull solutions that are in common use. The push of information may result from the data source to the user based on the query (and, e.g., a subscription), rather than a user querying a data store or data warehouse.

The systems and databases within an enterprise need to be searched and the data extracted to provide a response to a query. Current implementation of the searching and extracting involves the use of data warehousing, building and maintaining of the data within the warehouses and the interfaces to the warehouses, tools to perform queries, etc. A review of some systems in use by companies reveals that the cost of a query may be six man-years of work, estimated at more than $1M at current rates, and all just to report on 30 questions ($55K per question) regarding the events within an enterprise. By contrast, implementation of the presently described eventing-system has been simulated to process the same query and generate the same report in just three man-weeks, resulting in a huge cost savings, and providing a greatly improved ability to act on operational data within the enterprise. The savings in time and money from the distributing of the query components (which may also be referred to as query fragments), sending the query to the source, and the operating on real-time event data is significant.

The LE system described herein enables companies to turn their underlying systems into exception-based process management platforms that enable staff to manage exceptions, rather than to micro-manage steady-state processes. Examples of exception-based process management platforms may include elements such as: escalation policies to ensure corrective action is being taken, incorporation of resolution advice or workflow (such as expediting options and policies for late shipments), performance trending, and root cause analysis of disruptions and lead time fluctuations. The skilled reader will understand that many other examples are possible.

From one perspective, the LE eventing system as described herein could be considered to operate as a similar model as the Internet searches—where the Internet has many nodes, each with data, and indexes exist to route queries for particular data types, or data that might match certain criteria. However, the Internet nodes employ IP (Internet Protocol) addresses, which contain no information regarding the content. The addresses simply indicate a location, without indicating what information is at the address. In contrast, the LE system as described herein can use descriptive names that indicate the contents of data. The LE system can then index the descriptive name information, which enables the system to determine location and content. The LE system routes queries by correlating the descriptive name information (content and location) to queries, which indicates the relevant locations for relevant content.

As mentioned above, the LE system sends queries out to the data sources. In one embodiment, queries or query components are not sent all the way to the data source (e.g., the system where the underlying objects are stored and modified). Rather, the queries can be handled by logic that interfaces directly with the source, for example. Such logic may reside, for example, in the LE nodes. Thus, reference to sending out queries, and sending the queries to the source can be understood as sending queries toward the sources, which queries may be answered by the source or an intermediary that has the information to answer the query. The LE system can operate locally near or at the data sources, and find the data very quickly. A node of the LE system connects the data source to the event network, and may be referred to as a node coupled or directly connected to a data source (e.g., a last hop to the data source from the query source), as opposed to a node in the enterprise system that acts as an intermediary hop in a data path between the data source and a query source. When the LE system finds the information a user is looking for (e.g., a particular event), the system pushes the information to the user as the information is generated. Additionally, as mentioned above, the LE system can monitor the event data, and detect when a particular event or series of events or conditions takes place. When detected, the LE system can clip and push the information to the user who queried for the particular event, series of events, or conditions.

In one embodiment, the LE system employs global and local schema definitions, as well as transformation definitions to define the data relationships between the local and the global data schemas. A local schema can be understood as a standard or formatting used locally at a system to reference data. A global schema is a standard or formatting that is applicable to a management system that operates across the enterprise. The transformation or translation definitions provide a mapping of the local schema to the global schema. The transformation definitions may be implemented in the form of a lookup table, rules, or other logic. Consider the following tables:

TABLE 1

Global Schema

| Last_Name | First_Name | Cust_ID |
|---|---|---|
| Jacob | Harry | 1001 |
| Williams | Sally | 1902 |

TABLE 1-continued

Global Schema

| Last_Name | First_Name | Cust_ID |
|---|---|---|
| Smith | Bobby | 2098 |
| Thompson | Bill | 1020 |
| Ford | William | 2031 |
| Donner | Harriett | 2087 |
| Smith | Theresa | 1065 |

TABLE 2

Local Schema - Location 1

| LastName | FirstName | CustomerID |
|---|---|---|
| Jacob | Harry | 01001 |
| Williams | Sally | 01902 |
| Thompson | Bill | 01020 |
| Smith | Theresa | 01065 |

TABLE 3

Local Schema - Location 2

| LName | FName | CustID |
|---|---|---|
| Williams | Sally | 0-2001 |
| Smith | Bobby | 0-2098 |
| Ford | William | 0-2031 |
| Donner | Harriett | 0-2087 |

The global schema represents a central data view of all of the back-end integrated data. Thus, when users access a product, the view is provided via the global schema, and will not provide visibility to the underlying event source. Table 1 provides a simple example of a global schema with three fields: a last name, first name, and customer ID. The fields are labeled as Last_Name, First_Name, and Cust_ID, respectively, in Table 1. The example is mapped to two local schemas (Location 1 as per Table 2, and Location 2 as per Table 3) in two different event sources. The global schema view would contain the superset of the data in the other tables.

Note the difference in representation of the fields in the tables. Table 2 designates the fields as LastName, FirstName, and CustomerID, respectively, while Table 3 designates the fields as LName, FName, and CustID, respectively. The mappings and transformations allow the system to intelligently reconcile different representations of data through a single reconciled view via the global schema. In one implementation, the local data owners are generally responsible for mapping the local data schema to the global schema, allowing the local data owners more control over the mappings and data access.

Returning to the general description of the LE system, in one embodiment, the system supports complex event processing (CEP). In CEP, simple events can be aggregated to form multiple, higher-level "complex" (or derived) events. When abstracting from these derived events, the system provides clearly defined problems or opportunities. In CEP, events have the same relationship to one another as the activities they represent. Such correlation is a fundamental aspect of the services provided by CEP systems: events can be related to each other independently of their process context, which provides a powerful means to define services based on system-wide observations. CEP introduces a new dimension through interrelating events originated at different processes, which themselves can be spread across enterprise boundaries.

In CEP, events are processed by means of rules including event patterns, actions, and constraints. An event pattern is a template that matches certain sets of events. In one embodiment, the template or event pattern describes not only the events but also their causal dependencies, timing, data parameters, and context. Examples may include: "All orders from customer C in the last month", "All orders from frequent customers in the last month", etc. An event pattern rule is a reactive rule that specifies an action to be taken whenever an event pattern is matched. An event pattern may be matched with real-time as well as non real-time event data. A reactive rule has two parts: a trigger, which is an event pattern, and an action, which is an event that is created whenever the trigger matches. A constraint expresses a condition that must be satisfied by the events observed in a system. Constraints can be used to specify not only how a target system should behave, but also how its users should use it. When a pattern is detected, the rule is triggered, and the user (human or automated) can take actions in response.

CEP can be implemented as a logical component separate from the LE system, and may be implemented by a streaming event correlation engine, such as CORAL8, available from Coral8 Inc. of Mountain View, Calif.; STREAMBASE, available from StreamBase Systems, Inc. of Lexington, Mass.; or others. The CEP component consists of a rules engine that interprets the event patterns and constraints. These are expressed in a language such as a declarative language for describing patterns, defining logical constraints, and the like. In one embodiment, an event falls in one of the two categories: business process event, or structural change events. Business process events refer to business process events originated from a component that is part of a business process. Structural change events may be referred to as "meta-events," issued by the CEP component to trigger structural changes in the management of business processes.

In one embodiment, each event returned as a result to a query is self-contained, which refers to an event that has all data and mechanisms present to enable systems to fully comprehend and act on the event for what it stands for. The self-contained representation of events enables interoperability between various event producers, brokers, and consumers in a de-coupled architecture. Thus, an event consumer can handle a particular kind of event irrespective of its origin. An example of a self-contained event includes an object on which the user may perform a function to cause an action in the enterprise system, such as initiating a business process, or causing a change to an enterprise system. Such a self-contained event may be contrasted, for example, with an email notification that requires a user to access a separate business application to perform an action in response to the event.

In one embodiment, an event as described herein has three aspects: a form, a significance, and a relationship. The form of an event is an object, which may have particular attributes, and data components (e.g. message string, time stamps, descriptive text, etc.). The significance is the activity that the event signifies. The activity is related to other activities by time, causality, and aggregation. Thus, the relationship indicates how the activities are related.

events can take any of a number of different forms. Examples of event types include, but are not limited to: news feeds on the over a network, email exchanges, information about the physical world from a sensor (e.g., an RFID (radio frequency identifier)), RSS (really simple syndication) feeds sent over the Web (e.g., latest prices at a competitor's online store), changes or incidents in the IT (information technology) infrastructure, inventory levels falling below certain thresholds, shipping order requests, shipment confirmations, shipping order cancellation requests, shipment receipt notifications, invoice notifications, etc. All the examples are assumed to occur within specific processes. Thus, the events described are events within the context of a process.

In the context of execution of a process, a event can be defined as a meaningful change in the state of a object. A event can be delivered along with its context (e.g., additional information from relevant objects such as related objects) making it possible to take further actions by invoking tasks. In one embodiment, a event is logically self-contained in representing all the information pertinent to the situation causing the event. The event could directly contain all the relevant details or provide links to the relevant details. Note that the self-contained aspect of a event does not rule out the need for accessing additional data, rules, etc., for the purposes of processing and acting upon the event. Thus, in one embodiment, other data and/or rules are accessed in addition to receiving a response query to enable action on the event.

The eventing system as described herein may be considered to have design-time and runtime aspects. In the design-time, query patterns may be selected, indexing of the system can be configured, and the data sources enabled to generate data streams. The LE nodes are thus enabled to locate information, and establish subscriptions with the data sources at runtime. At runtime, a complex event processing (CEP) rules engine can trigger events as the result of a positive pattern match. In one embodiment, the CEP engine executes as a separate process in parallel to a "worker" processes, or event execution node (EN) that implements the logic of the events.

In one embodiment, the ENs essentially have two parts: an event correlation module that interfaces with the underlying CEP, and actions that are implemented as processes. The event correlation module may inform the CEP of the event stream(s) to which it needs to subscribe and the EN will pass to the CEP the event correlation pattern that it wants to detect. In one embodiment, the EN sleeps or idles while it waits for the CEP to detect the event defined by the event pattern. When the CEP detects the specific event pattern, it will wake up the EN and pass the high-level event data that was detected to the EN. When the EN is awake, it executes an action procedure associated with the event pattern.

The action procedure may trigger one or more of the following, which is not meant to be an exclusive list of possible actions: 1) enrich the event data with additional information/data to make the event actionable (the associated data that comes with the event data may not be sufficient to make the event actionable). The procedure may use a database connection to, for example, a federated database engine to access data from one or multiple distributed sources through a single unified interface and data organization; 2) directly trigger another action, such as by directly connecting to a backend server (e.g., mySAP ERP) to cause an action to take place. The other action may simply change the value of a data item within the server or it may cause a corresponding process to execute; 3) publish one or more new events, such as generating one or more streams of data. In one embodiment, such data streams are in the form of XML messages. Various adapters are available to redirect these streams to a user in a selected channel. The adapters may allow redirection via: email (a message sent as email to one or more specific recipients), RSS (a feed can be produced and delivered pertinent information and links to the laptop, desktop, or any mobile device via an RSS Reader to which the user can subscribe), computer dialog (a message can be sent to the user's display in any of a number of manners, such as a bar at the top of the user's screen that could display alerts/messages as they arrive, a web browser, or a MICROSOFT OFFICE task pane (integrated with SAP through DUET)), or SMS to mobile phone (a message can be sent to a specific user's cell phone).

Figure 2:
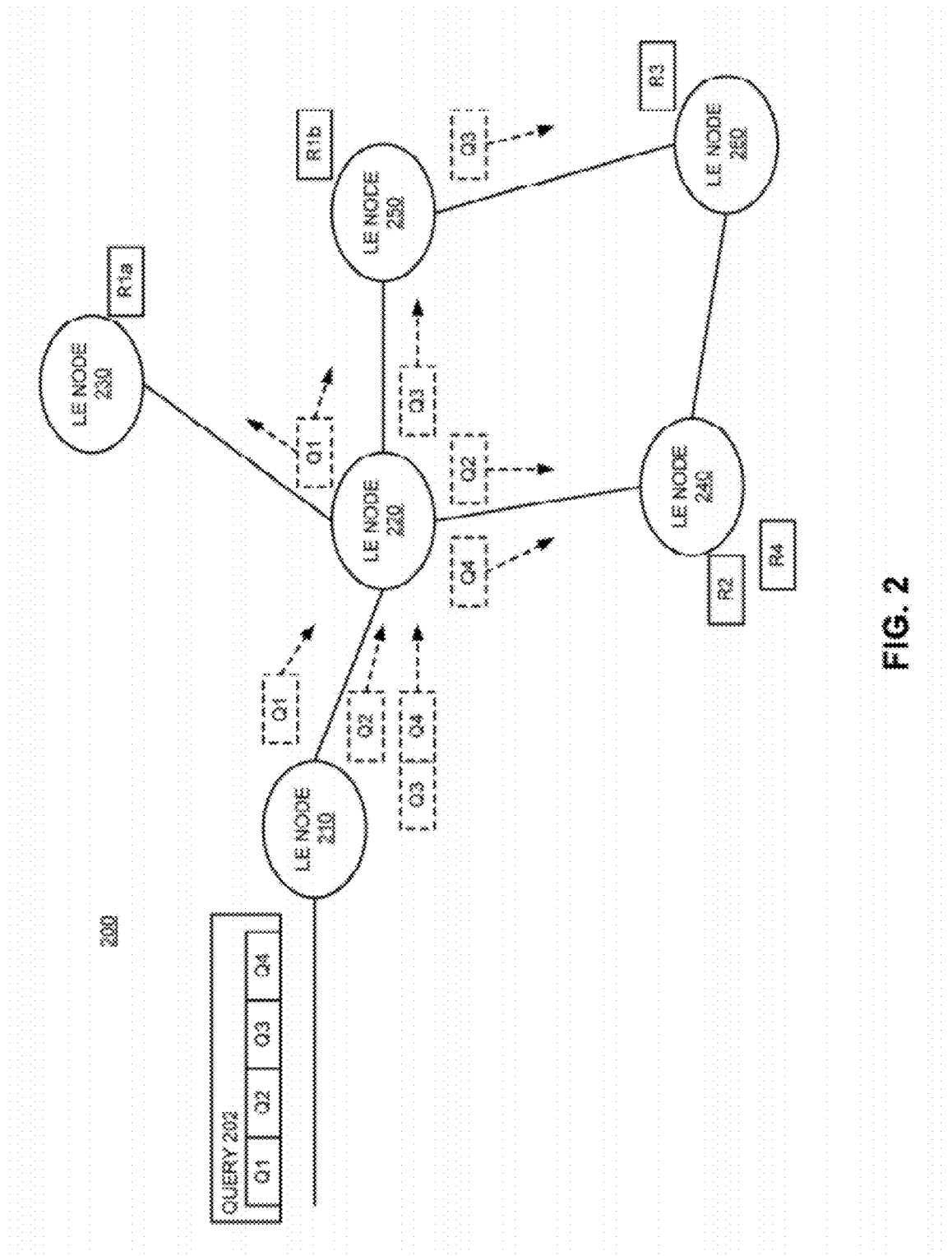
FIG. 2 is a block diagram of an embodiment of an enterprise system that separates event queries into component parts and combines results for the component part queries.

FIG. 2 is a block diagram of an embodiment of an enterprise system that separates event queries into component parts and combines results for the component part queries. System 200 is an eventing system or an LE system according to any embodiment described herein. System 200 includes various LE nodes, 210, 220, 230, 240, 250, and 260, each of which may have one or more associated data source subsystems (not shown). For purposes of description, assume that certain nodes are proximate to the data source for certain information. Being proximate to the data source refers to the node being the closest query processing element to data source (which may be the data source itself). As illustrated, the query response components are designated R1, R2, R3, and R4, referring to respective responses for query segments Q1, Q2, Q3, and Q4. The responses components R1, R2, R3, and R4 represent event data that can be returned as data objects, actionable content, or some other form. The separate response components can then be selectively combined or joined to form a complete response.

Query 202 includes query segments or query components Q1, Q2, Q3, and Q4. LE node 210 is the access node for the user that generates query 202. Thus, node 210 receives the query for LE system 200, and parses the query into component parts Q1, Q3, and Q2+Q4. LE node 220 may receive the queries and route them to the data sources, based on descriptive name identifiers that indicate location and content of the data. Thus, Q1 is routed to LE node 230 and LE node 250, which both have response components R1. LE node 240 includes data (represented by R2 and R4) to respond to Q2 and Q4, and thus, Q2 and Q4 are routed to LE node 240. To receive a response to Q3, LE node 220 needs to route the query component to LE node 260, which has data R3. As illustrated in FIG. 2, LE node 220 can route Q3 either through LE node 250 or LE node 240. In actual implementations of systems, there may be similar situations where a query can be routed in one of multiple ways to a data source. In the illustrated example, LE node 220 routes the query through LE node 250. In one embodiment, the selection of routing through LE node 250 is random, and there may not be any clear design choice to elect one route over the other. However, design choices could be made, based for example, on traffic, on a type of connection (e.g., secure, protocol type, etc.), for purposes of combining the query with another query generated at LE node 250 for data R3, or because LE node 250 is listed before LE node 240 on a list of potential next hops in a routing table, or some other reason. Thus, routing can be conscious of the traffic load. For example, perhaps the link between LE node 220 and LE node 240 has more traffic than the link to LE node 250. In another example, perhaps another query Q3 (not shown) is also at LE node 250; in such a case, Q3 from query 202 can be combined or joined with the other Q3 query to make a single query on LE node 260, and R3 is duplicated at LE node 250, which could send R3 to respond to query 202, and to another query source (not shown).

In one embodiment, LE node 210 breaks query 202 into component parts Q1, Q3, and Q2+Q4—meaning query 202 is only parsed three ways at LE node 210. The parsing and routing can be iterative within system 200. Consider that an additional LE node (not shown) is coupled to LE node 240, which has data R2, while data R4 is generated at LE node 240. Thus, LE node 210 could parse the query as shown, and LE node 220 as shown (or alternatively, LE node 240) could further parse the query Q2+Q4 into separate queries Q2 and Q4. This illustration is intended to show and describe the breaking down of the queries into component parts. The query is shown with various sub-elements, which get separated and sent to the next node, which then further separates components 3 and 4. The concept of sending a component part to multiple nodes is shown with Q1, and the concept that multiple component parts may be sent to the same node is shown by node 240.

Thus, LE system 200 can parse queries in any number of ways, and the system can iteratively parse queries into separate components. Additionally, system 200 is intelligent enough to combine query components (e.g., the example given above about an additional query Q3 at LE node 250), and to duplicate queries (sending Q1 to both LE node 230 and LE node 250). The responses are all combined as returned to provide the desired information. In the case where a query was duplicated, such as with Q1, the separate responses, R1$a$ and R1$b$ are combined for a response R1 with all the information from both data sources.

As discussed above, there is an assumption of knowledge between the nodes for system 200 to operate in the manner described. In one embodiment, system 200 configures itself automatically. For example, system 200 could automate the following: discovering the nearest nodes, registering with those nodes, registering publishable events, and connecting to subscribed event streams. In such a manner, each node is able to access real-time data from other nodes. Other manners of configuration and accessing real-time data are possible. The nodes could push (e.g., broadcast) data to its neighbor nodes, which could then request specific data. Automated discovery can be accomplished with a local network discovery, where an expanding ring search is employed using publish-and-subscribe. In one embodiment, a discovery could be performed by a discovery request having an initial TTL (time to live) of one hop. If a node with routing information exists within the one hop, the receiving node receives the request and responds with its IP address and port number. The requesting node can then connect directly to the responding node with TCP and register its publishable events. If a node with routing information does not exist within one routing hop away, no response is sent. After time out (recall the one-hop TTL), the node can send out a discovery request with a two-hop TTL, and repeat the sequence.

Wide-area network discovery can employ a seeded approach, where a node is configured with an IP address of a primary node with routing information. The node can then connect, for example, using an SOAP (simple object access protocol), HTTP-based (hypertext transfer protocol), or RPC (remote procedure call) protocol. After the initial connection, a similar registration procedure as described above can commence.

Figure 3:
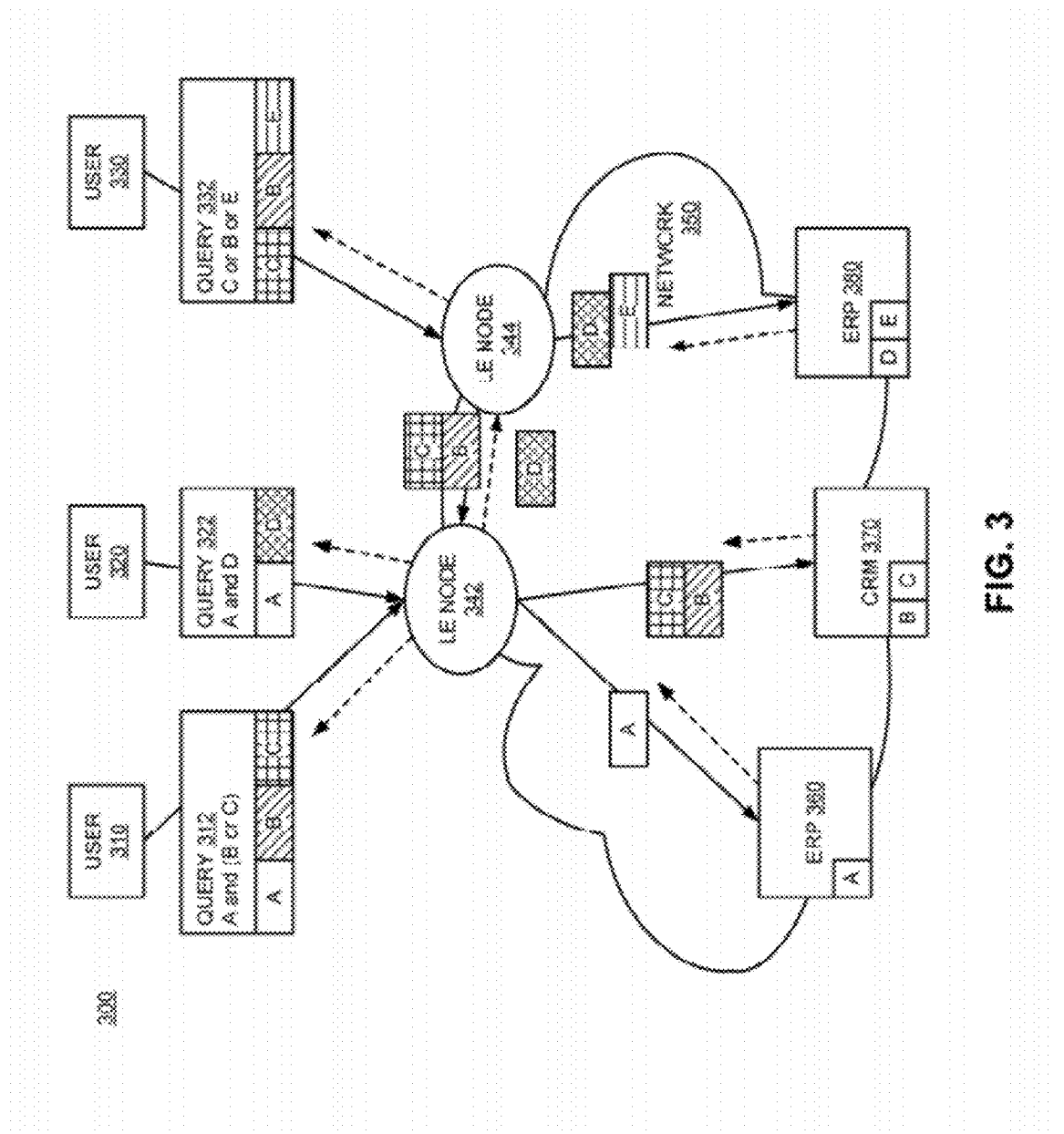
FIG. 3 is a block diagram of an embodiment of an enterprise system that combines query components for stream sharing.

FIG. 3 is a block diagram of an embodiment of an enterprise system that combines query components for stream sharing. While the focus of FIG. 2 was on the parsing or separating of query components from a query, FIG. 3 illustrates the combining of query components (e.g., parsed segments of a query, or simple queries). Such combining (which may also be referred to as joining) has at least one advantage of reducing network bandwidth in that a single query can be sent to a data source in lieu of several queries for the same information. The implementation cost is that each node must be intelligent enough to track or monitor the source of query components, and what query sources should receive what response data. Additional system intelligence may include nodes determining whether a similar query is being handled at a nearby or neighboring node, and forwarding the query to that node for purposes of joining the query.

System 300 represents an LE system according to any embodiment described herein. System 300 includes user 310, user 320, and user 330, each of which are users that generate queries 312, 322, and 332, respectively. Query 312 requests data related to A and (B or C). Query 322 requests data related to A and D. Query 332 requests data related to C or B or E. Each query component is represented by a differently shaded block. Thus, parsing the queries (for example, as may be performed in FIG. 2), the query for user 310 can be broken down as seeking data for A, B, and C. Similar parsing is performed for users 320 and 330. Consider that each user connects to the enterprise system, as represented by network 350 via edge devices, which are LE nodes as described herein for purposes of these examples. LE node 342, an edge device, couples users 310 and 320 to enterprise network 350, which LE node 344 couples user 330 to the network. The solid arrows represent the queries, while the dashed arrows represent responses that will be returned. At LE node 342, queries 312 and 322 will be parsed into the component segments illustrated, while LE node 344 will perform similar parsing for query 332. For purposes of simplicity in this example, consider that each query is completely parsed, rather than having a process of iterative parsing as discussed above with respect to FIG. 2.

Network 350 includes various data sources, as shown by ERP 360, CRM 370, and ERP 380. ERP 360 includes data to respond to query segment A, CRM 370 includes data to respond to query segments B and C, and ERP 380 includes data to respond to query segments D and E. Query segment A from queries 312 and 322 can be combined at LE node 342 to send to ERP 360. Query segment D from query 322 is sent to ERP 380 via LE node 344. Also, segment E from query 332 is sent by LE node 344 to ERP 380.

As to segments B and C, query 332 requests both segments, which are also requested in query 312. Although not shown, either B or C, or both, could also be requested by another user accessing LE node 342. In one embodiment, LE node 344 sends B and C to LE node 342, where the query is combined with the query from user 310. LE node 342 sends a single query (for each component) to CRM 370. The response to the queries are sent back to LE node 342, which can then return the response components corresponding to the query components to user 310, as well as to LE node 344, which can return the response components to user 330.

Figure 4:
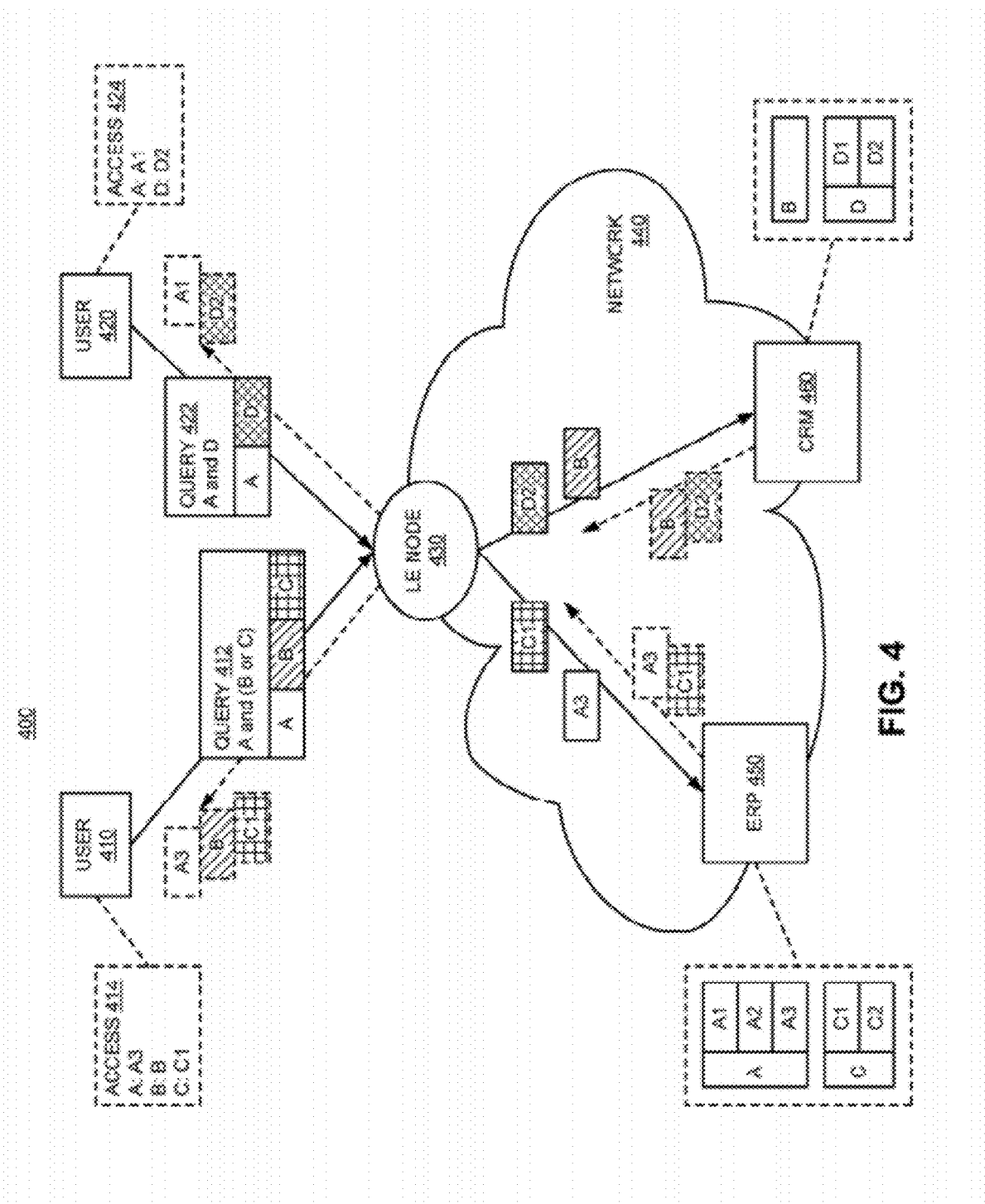
FIG. 4 is a block diagram of an embodiment of an enterprise system that selectively combines and filters query components based on a security level of a query source.

FIG. 4 is a block diagram of an embodiment of an enterprise system that selectively combines and filters query components based on a security level of a query source. System 400 represents an LE system according to any embodiment described herein. Thus, the parsing and joining mechanisms described above with respect to FIGS. 2 and 3 could be applied in system 400, although they will not be described in detail with respect to the description of FIG. 4.

System 400 includes user 410 that is the query source of query 412, which has component segments A, B, and C. System 400 also includes user 420 that is the query source of query 422, which has component segments A and D. Consider for purposes of description that one or more component parts of the queries have multiple levels of potential information access. For example, if A represents customer information, perhaps different items of the customer information may be available to a sales representative versus a finance manager; and, different items of customer information may be available to a project manager in charge of transactions with the customer. Thus, consider that based on a security, privilege, user identity, or other restriction, different information may be available in response to a query. For example, if the sales representative and the project manager were to make an identical query related to certain customer information, different data may be appropriate to respond to the two queries, even though the queries may be identical on their face.

System 400 also includes ERP 450 and CRM 460, which represent data sources as has been described previously. Users 410 and 420 in this example can access ERP 450 and CRM 460 via LE node 430, which is an eventing node. ERP 450 and CRM 460 are shown as part of network 440, of which LE node 430 is an edge device with respect to users 410 and 420. ERP 450 and/or CRM 460 separated from LE node 430 by any number of intermediate LE nodes (not shown), and they may not be directly connected to the same LE node. Alternatively, one or both of ERP 450 and CRM 460 may be connected to LE node 430.

ERP 450 generates event data A and C, which have different respective levels of access A1, A2, and A3, and C1 and C2. Thus, a query for A may return A1, A2, and/or A3, depending on the security or privilege level of the query source. Such privilege may be determined by password, digital certificate, or other known authentication mechanism. Similarly, CRM 460 generates event data B and D, which may respective levels of access B, and D1 and D2. The levels of access associated with each element of event data is arbitrarily selected herein for purposes of discussion, and any number of levels of access may be provided. However, more levels of access will require greater levels of control/management logic to manage the access.

The different levels of access are illustrated for the users by access 414 and access 424 for users 410, and 420, respectively. Access 414 shows an access level for user 410 of some arbitrarily-labeled 'A3' for element A, 'B' for element B, and 'C1' for element C. For user 420, access 424 shows access levels of 'A1' for element A, and 'D2' for element D.

Security of the data can be implemented in a number of different ways. In one embodiment, security is implemented at the data source. Thus, ERP 450 and CRM 460 can implement security features and return only data that is appropriate for the query sent. For example, a query for 'A' at ERP 450 may be responded to with 'A2', based on a determination made by ERP 450. Alternatively, an LE node local to the data source may perform some or all of the security. Thus, the LE node could receive a query for 'A', query ERP 450 for 'A2', and then return the results to the query source. In one embodiment, the security is implemented at least in part by LE node 430, or the node that is directed coupled to the query source. Thus, the node receiving the query can identify the level of privilege of the user, and send a query commensurate with the level of access of the corresponding user. In yet another embodiment, security may be implemented at least in part at the user. Thus, a client entity (e.g., a software module that implements security) could filter queries from the user, and forward query elements that have security or access level information associated with them. Note that the queries, whether as filtered at the client or by a node in the network, can be altered for specific data based on access level, or they may simply have associated information (e.g., query metadata) that indicates the level of access associated with the query. As illustrated, only the ultimate query is shown on the solid arrows going to ERP 450 and CRM 460, representing the final security decision. The figure does not intend to show what entity generated the final query.

In one embodiment, LE node 430 implements query component joining Thus, queries for the same event data are combined, and a single query is submitted to a data source. Such query component joining can be further extended with security concepts. For example, observe that user 410 generates a query for 'A', and has an access level of 'A3' with respect to A. Assume for this example that an access level of 'A3' means user 410 can access 'A1', 'A2', and 'A3'. User 420 also generates a query for 'A', but has an access level of 'A1' with respect to A. In one embodiment, LE node 430 (or another entity implementing security) receives both queries, combines the queries into a single query for event data of access level 'A3', and forwards the request to ERP 450. ERP 450 then responds with the event data corresponding to the access level of the request. LE node 460 can then filter the reply data, sending event data corresponding to access level 'A3' to user 410, but sending only data corresponding to access level 'A1' to user 420. As to the queries for C and D, these queries may be sent as only requesting C1 and D2, respectively, corresponding to the access level of the user making the request. Assume that another node (not shown) is between LE node 430 and ERP 450. LE node 430 could forward a request for event data 'C1' to that node. If that node also had a request from another user (not shown) for access to event data 'C2', the node could forward a request to ERP 450 for event data 'C2', then return only event data 'C1' to LE node 430. Thus, system 400 can selectively join and separate and filter requests and data responses.

It will be understood that the description above with respect to security levels of access may be implemented by RBAC (role-based access control) or a similar mechanism. RBAC is generally an access control system, or a system of controlling access to data based on authorization of the entity attempting to access the data. Roles may exist for various functions within the enterprise or for various employee positions. Access permissions can then be tied within the enterprise system to a particular role, without the need for additional authentication information. The implementation of RBAC systems is generally understood, and will not be discussed in detail here.

Figure 5A:
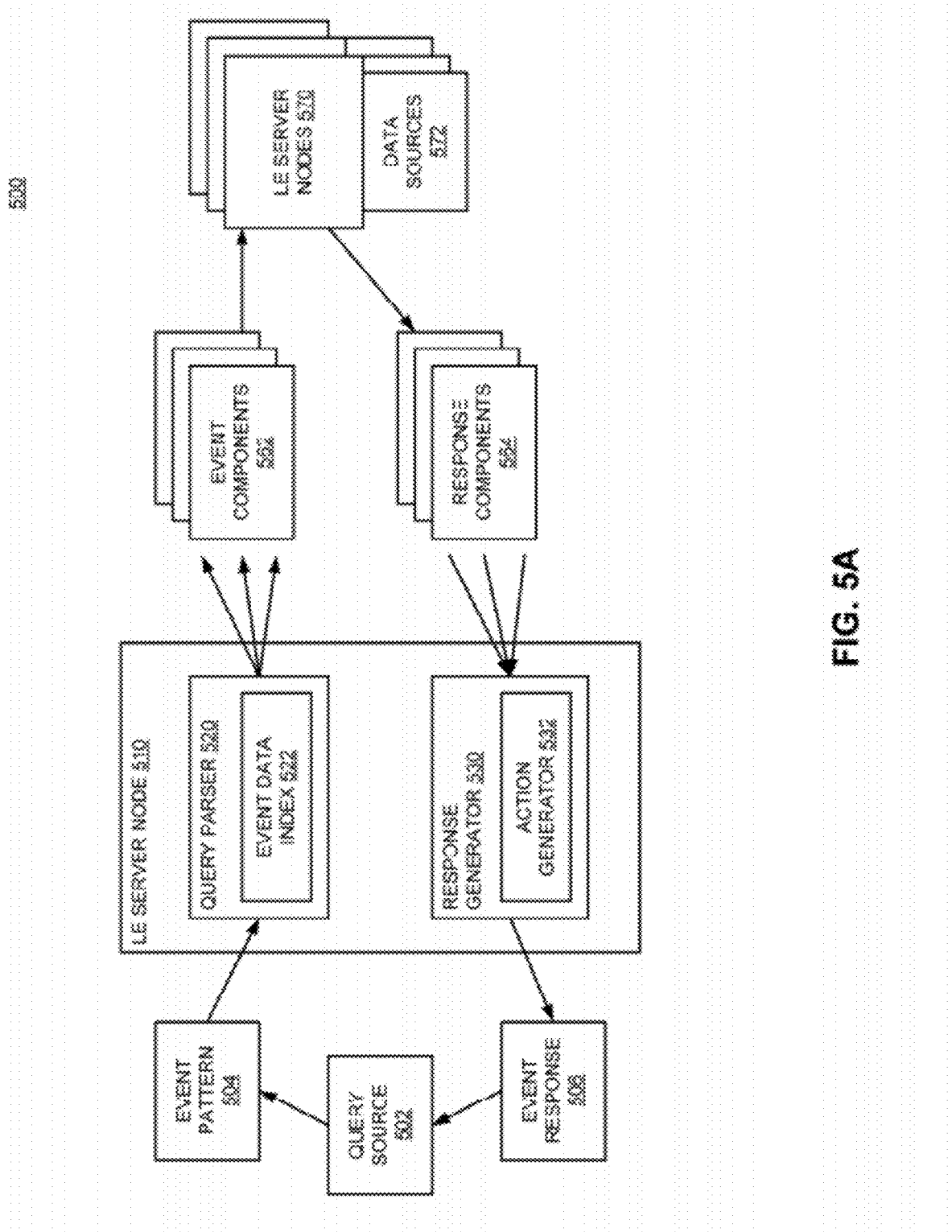
FIGS. 5A-5C are block diagrams of embodiments of a event pattern monitoring system.
Figure 5B:
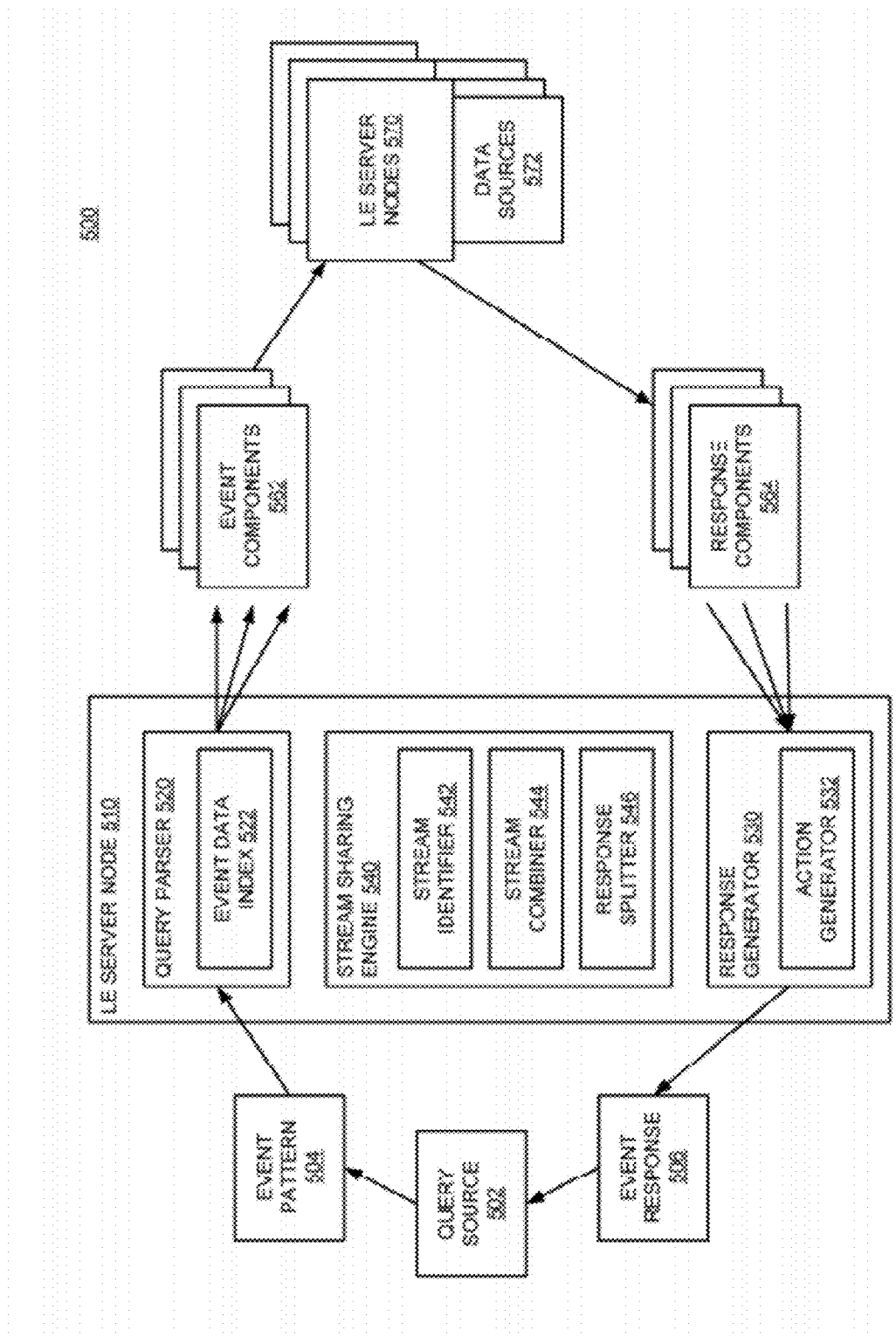
Figure 5C:
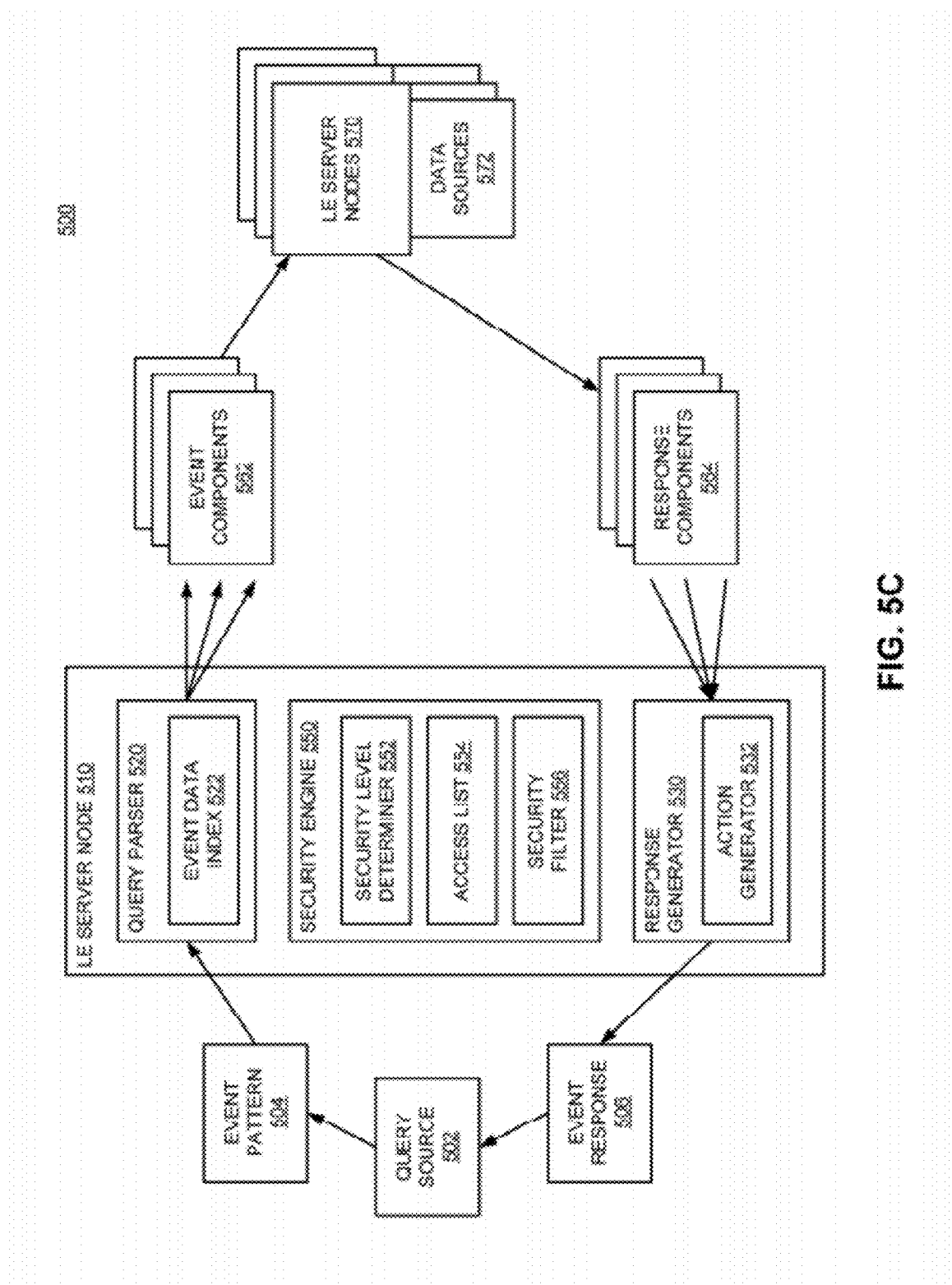

FIGS. 5A-5C are block diagrams of embodiments of a event pattern monitoring system. System 500 represents an eventing system according to any embodiment described herein. System 500 shows elements that are common to all of FIGS. 5A-5C. The differences in the figures are the inclusion of certain features of LE server node 510. The common elements are first described with respect to FIG. 5A, followed by the different features in the other figures.

System 500 includes query source 502, which represents a human or electronic user that generates a query for event data. Note that a query may be a question or a request for information that is generated and then immediately sent to search for information. Alternatively, a query may be a pattern of events or conditions within the enterprise network that a user wants to be apprised of. Both types of queries are supported in the eventing system described herein. However, the simple type should be understood based on the description above, and the discussion here will focus more on the pattern of events.

The event pattern query type may be considered a monitoring query, in that a "query" is generated, and the system "waits" for data that answers the query. Such a system may also be referred to as an exception-based system, waiting for a pattern to be matched (an exception), rather than being informed of every detail of the system's operation. Alternatively, the system may be an alerting system, which responds when an event is detected. In the event data system, a pattern is generated, which describes one or more conditions that should be present for the pattern to be matched. The description may include one or more events, logical predicates, functions, operators, etc. The logic of the pattern is not limited to a single condition; rather, patterns could be defined that indicate dependencies of conditions (e.g., a pattern may only be matched if two conditions are true, or only if one condition occurs before another). Event pattern 504 is a pattern associated with a query as described. Event components 562 may represent individual queries that are sent, and/or they could represent data stream subscriptions.

Query source 502 sends the query (not shown) with event pattern 504 to LE server node 510. In one embodiment, LE server node 510 stores event pattern 504, and responds when the pattern is matched with enterprise event data. LE server node 510 matches event pattern to real-time event data by querying data sources 572. As referred to herein, "matching" data refers to data that has a format and/or content related to one or more conditions of a query. Query parser 520 includes logic that breaks event pattern 504 into its component elements, and each component can be queried separately, and separately matched. In one embodiment, query parser 520 includes event data index 522, which includes an index of event data for the enterprise. Event data index 522 includes information that indicates the type of content that is generated by certain data source 572. Thus, not only does LE server node 510 have addressing (e.g., routing) information for each data source 572, but also knows what information type may be at each one, to further be able to route queries only to those sources that may be able to provide a response to the query.

Event components 562 represent the one or more query components or query segments, or subscriptions to streams from the data sources that provide data about such segments, of event pattern 504 that LE server node 510 sends through the enterprise network. LE server nodes 570 represent other nodes in the enterprise network, and will be interconnected as configured within the enterprise. It should be expected that while some configurations may overlap to some extent among enterprises, the configuration will largely be custom for each enterprise. LE server nodes 570 enable access to data sources 572, with LE server nodes having zero or more associated data sources 572. The queries are processed as close to the data source as possible within the enterprise configuration. Some enterprises may be configured to have each data source receive and process queries. Others may have the associated server node process and respond to the queries. In one embodiment, the event data is available from the data source in the form of a data stream or data feed. Such streams or feeds may work by the data source sending updates periodically or as they occur. The data can be sent, for example, to the associated server node, which can then respond to queries with real-time data.

In one embodiment, the queries are responded to individually, and response components 564 represent the separate responses to each individual event component 562. LE server node 510 includes response generator 530, which receives the response components 564, and generates a response answers the query by matching the event pattern 504. Event response 506 indicates a change at a data source that matches the event pattern, and thus represents such an event. In one embodiment, event response 506 is an actionable data object or a data object through which an action may be initiated. In one embodiment, actions that can be performed on the data object are generated or compiled (e.g., from available components within the enterprise, or response components 564) by action generator 532. Actions include operations that can be performed in response to the conditions of event pattern 502. In one embodiment, an action may include launching a process of the enterprise system.

FIG. 5B illustrates an embodiment of LE server node 510 with a stream sharing engine. Stream sharing engine 540 includes various functional blocks for stream sharing functionality in LE server node 510. The stream sharing refers to the ability of LE server node 510 to reduce bandwidth by sharing combining event components 562 with other queries for the same components. The "stream" may be initiated and managed by the server node itself, apart from any other component in the enterprise network. Alternatively, other server nodes may cooperatively stream. For example, each node may expose what event patterns it is looking for. When a node receives a query, it may first look to each neighbor for the response information. With exposed query data at the neighbors, a node could then be able to determine whether a query (component) of one of its queries matches that of another node. Matching query elements can be "combined" by one of the nodes sending the query to the source, and then splitting out the response.

In one embodiment, LE server node 510 includes a "join table," (not shown) which refers to a table or data structure that indicates an LE server that subscribes to a particular event data feed. Different LE servers may subscribe to different feeds, and not all LE servers will necessarily subscribe to all feeds. Thus, a join table can indicate what LE server subscribes to what feeds, and indicate the type of information that may be available. In one embodiment, routing is probabilistic, where queries are sent to nodes that may have, or have access to, particular data content. The routing is performed based on a description of the data content, where describing the data broadly would mean more inclusive access to the data, while a more narrow definition is more selective, or exclusive. More inclusive access to data increases the possibility that all information relevant to answer a particular query is included, but also increases the probability that information not relevant to answering the particular query will be accessed. More selective access decreases the possibility that information not relevant to a query will be accessed. Nodes at a core of the network may benefit from being more exclusive, to prevent generating extra network bandwidth by having other LE nodes access data through them that would produce a "false hit"—meaning the data is not actually relevant to answering a query. Edge devices on the network, on the other hand, may be configured to be more inclusive to attempt to make sure every possible data source is accessed. A network could be designed where all nodes have the same level of exclusivity. Additionally, one or more intermediate layers of exclusivity may be provided.

Stream sharing engine 540 is illustrated with stream identifier 542, stream combiner 544, and response splitter 546. Stream identifier 542 enables stream sharing engine 540 to identify and access data streams that may be related to a query component received at LE server node 510. Stream combiner 544 enables stream sharing engine 540 to receive and combine query components from other users of LE server node 510, or user of other nodes, which generate query components for the same data as a stream subscribed to by LE server node 510. Thus, LE server node 510 can add the user to the stream. Stream combiner 544 includes a tracking mechanism (e.g., a table or list of participants, with addresses and possibly security access information) for the query sources. Response splitter 546 enables stream sharing engine 540 to split a response or a data stream to each query source. Such splitting could be performed, for example, by the use of such a table or list of participants, and sending the data to each one. Alternatively, each participant may be informed of the data, which could then cause a client agent to request and receive the exact data.

FIG. 5C illustrates an embodiment of LE server node with a security engine. Security engine 550 includes various functional blocks for implementing security at LE server node 510. Security engine 550 is illustrated with security level determiner 552, access list 554, and security filter 556. Security level determiner 552 enables security engine 550 to determine the level of access associated with a user, for example, as described above. Determining the security level may alter how LE server node 510 generates event components 562 for query, and/or may alter how LE server node 510 manages received data. For example, queries may be generated that indicate the level of access. Received data may be filtered according to the level of access.

Access list 554 represents one example of a type of row level filter that enables security engine 550 to maintain lists of security information for users, and levels of access available from different data sources. Other row level filters may include other mechanisms to filter the event data based on the information in each row of data, and separate it to the users based on levels of access available. Security filter 556 enables security engine 550 to filter the received data, as mentioned above.

Figure 6:
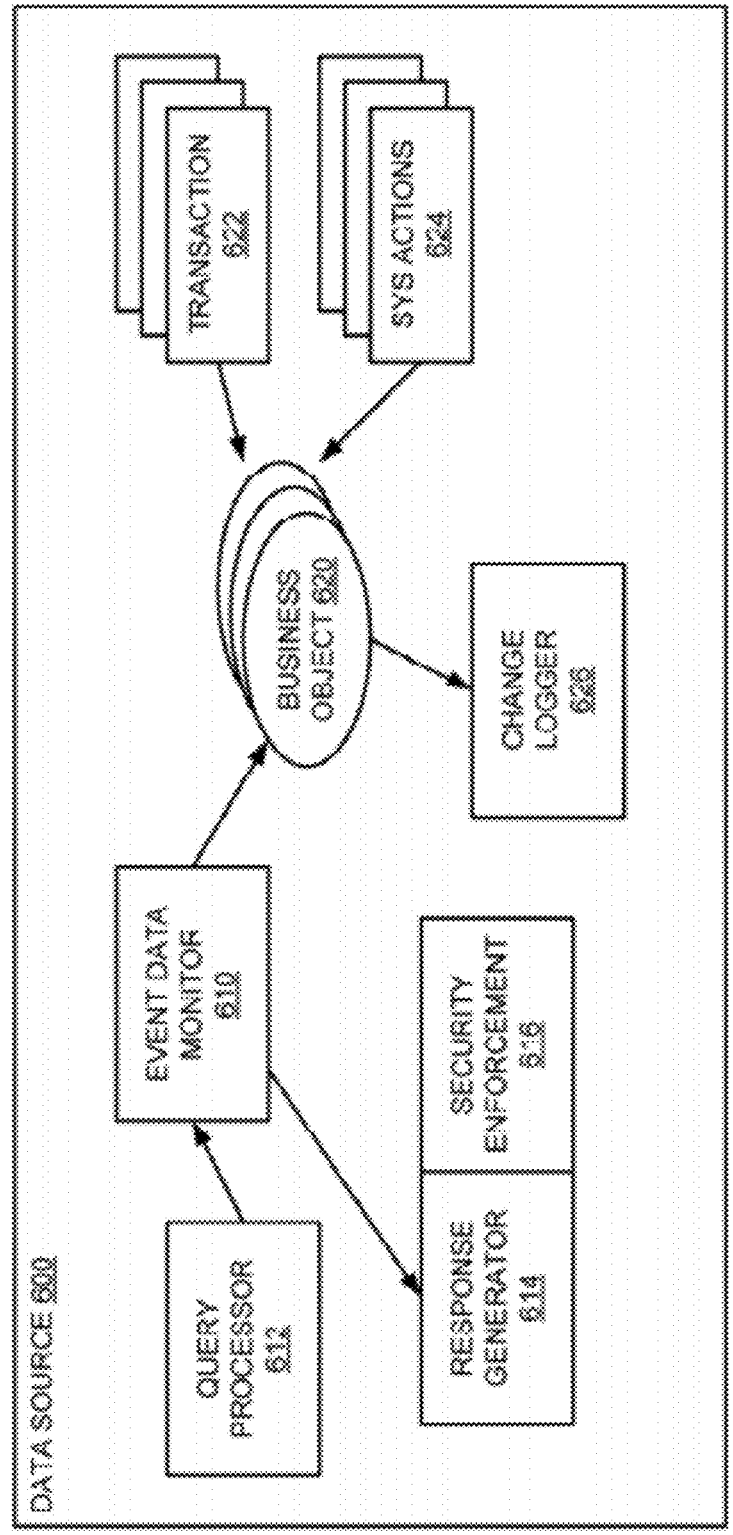
FIG. 6 is a block diagram of an embodiment of a data source that generates real-time event data and processes queries about items of data related to events.

FIG. 6 is a block diagram of an embodiment of a data source that generates real-time event data and processes queries about items of data related to events. Data source 600 represents a data source according to any embodiment referred to herein. Data source 600 includes one or more objects 620. The objects may be affected by operation within the enterprise of which data source 600 is a part, or an operation outside the enterprise that the object tracks (e.g., stock value, currency value, etc.). Transactions 622 and system (sys) actions 624 represent operations that may change object 620. Transactions 622 refer to general dealings of the enterprise, or operations outside the enterprise, and system actions 624 refer to anything else, such as inventory recounts, system audits, changes in configuration, etc., which might change the object.

In one embodiment, data source 600 includes change logger 626, which illustrates the logging and committing of the changes to a repository. Note that access to real-time event data described herein does not necessarily alter conventional operation of the system, including logging and data warehousing the event data. However, in lieu of, or in addition to the data being available from the data warehouse, the data can be available "live." The real-time branch of the event data is through event data monitor 610. Query processor 612 represents an element that receives and processes queries at the data source level. Such a query processor may, in fact, include the data stream components necessary to subscribe other entities to a data stream of event data available from data source 600. Response generator 614 sends out the event data to query sources and/or subscribers. In one embodiment, data source 600 performs processing of queries, which may include enforcing security restrictions on data access. In an implementation where data source 600 enforces security on data access, security enforcement 616 may be included to filter data returned based on security restrictions.

Figure 7:
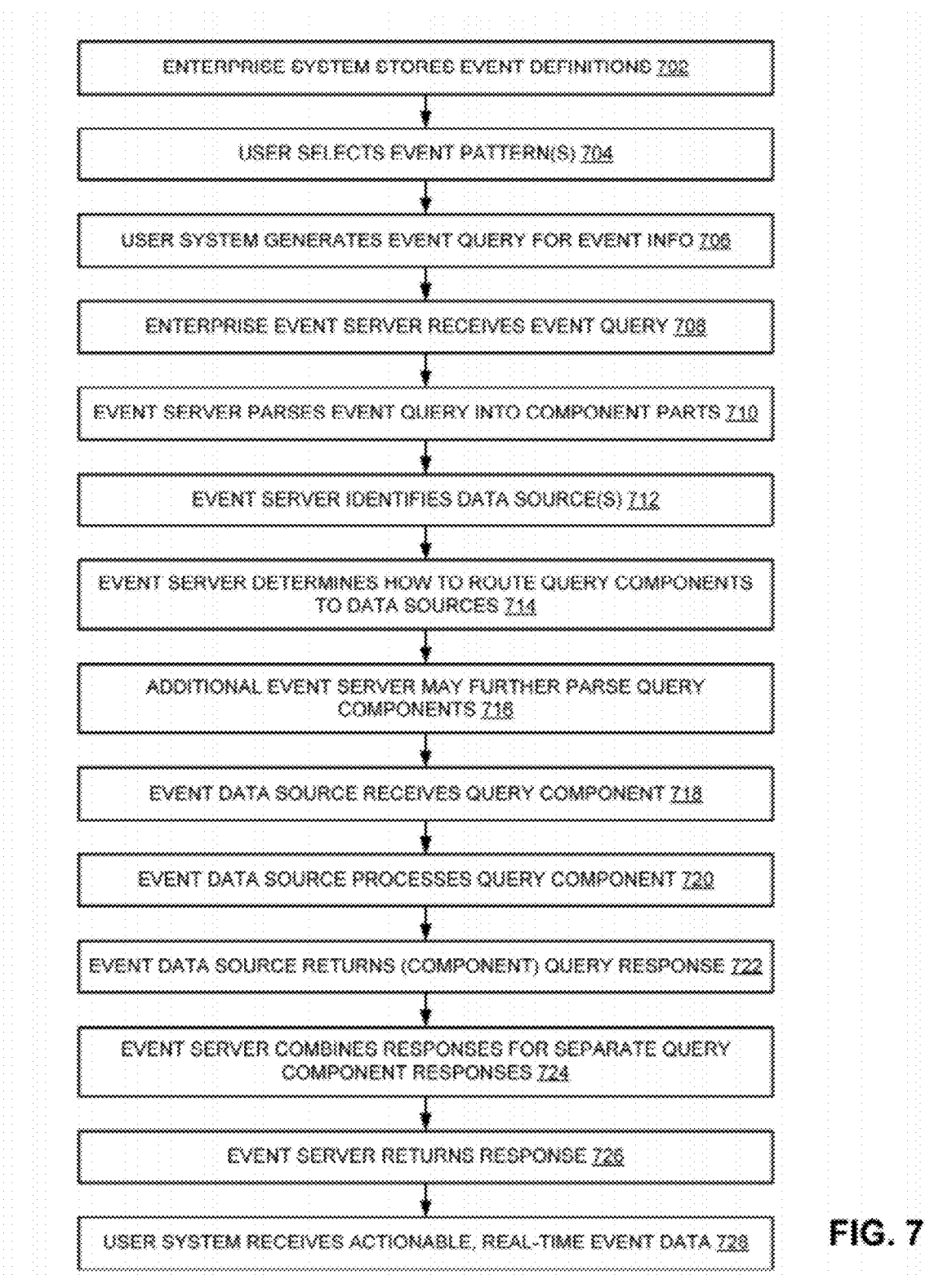
FIG. 7 is a flow diagram of an embodiment of a process for federating event information.

FIG. 7 is a flow diagram of an embodiment of a process for federating event information. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

In one embodiment, an enterprise system stores event definitions, 702. The event definitions can describe possible occurrences within the enterprise that might be of interest to a particular user. The definitions may be available to a user through an application that enables the user to generate a query, such as by building a pattern of events from the stored event definitions. The user thus selects one or more events for an event pattern, 704, or other query. The user system generates an event query for event information, 706. The event information may request real-time as well as historical data. Such a query may be generated, for example, by an agent or user application on a client device. The query is sent to an enterprise event server, which receives the event query, 708. The enterprise event server includes an LE server as described herein.

In one embodiment, the event server parses the event query into component parts, 710. Parsing the query can be done with lookup tables or other tables or matching mechanisms. Each query can be filtered to match components with data descriptions that indicate content available from a particular neighbor node. Each component part will be forwarded through the enterprise network as a separate query. The eventing system will attempt to send the query as close to the data source(s) as possible for processing. The event server identifies one or more data sources that have information relevant to the query, 712. The event server determines how to route the query components to the data sources, 714. For example, the event server may access routing table information, and/or data source index information to determine how to route the query components. The event server then forwards the query components toward the data sources.

In one embodiment, a query component may be further parsed by an additional event server that is between the first event server and a data source, 716. The event servers will each parse the queries based on the indexing information they store and the routing information about where data is located within the enterprise. The data source eventually receives one or more query components, 718, which the data source may process, 720. In some implementations, processing of query components is not performed at the data sources, or may not be performed at all data sources, or may not be performed at data sources in all cases. In general, the query is processed as close to the data source as possible to receive the most up-to-date information (real-time events). Processing the query as close to the data source also reduces the amount of data traffic, and the network distance traveled, which reduces the load on communication resources. Whether at the data source, or proximate to the data source (for example, at an LE node that interfaces directly with the data source, or at a server one or more hops away from the data source).

The data source returns a query response, 722. In the case where the query received is a query component, the response will be to the query component, which will provide only some of the information necessary to respond to the original user query. The event server combines a complete response from the separate query component responses received from all data sources, 724. Combining of a response may be to combine multiple component responses, each to a different query component segment, as well as combining multiple responses for the same query component segment received from multiple different data sources. Combining the response may require processing of the data. For example, overlapping data or conflicting data may be compared and eliminated. Data formatting may need to be modified to be actionable. The event server returns the response to the user, 726. The user system may receive an actionable, real-time event, 728. An actionable event may allow the user to access an enterprise backend for additional information, launch actions, initiate processes, or other procedures.

Figure 8:
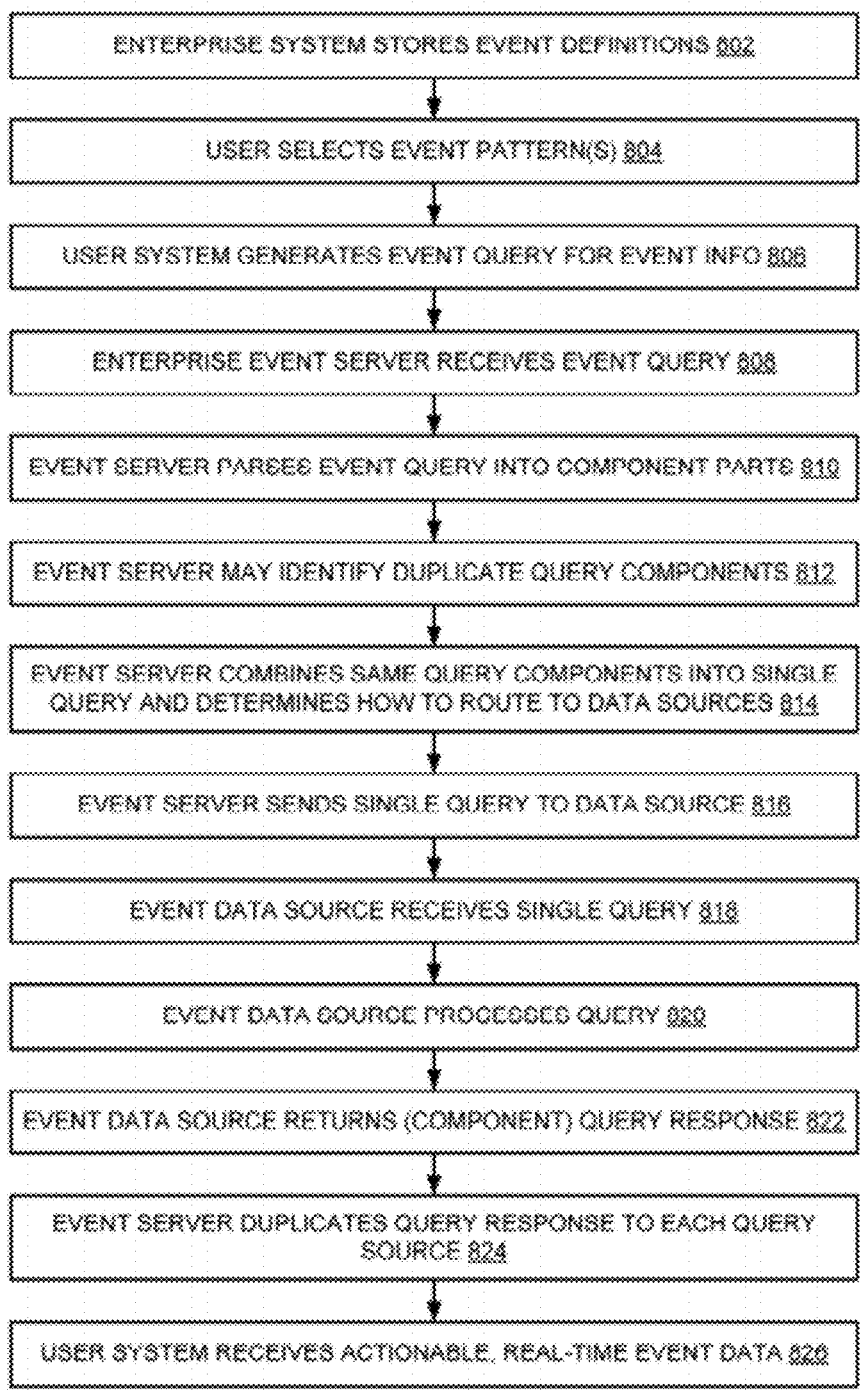
FIG. 8 is a flow diagram of an embodiment of a process for stream sharing of event information.

FIG. 8 is a flow diagram of an embodiment of a process for stream sharing of event information. In one embodiment, an enterprise system stores event definitions, 802. The event definitions can describe possible occurrences within the enterprise that might be of interest to a particular user. The definitions may be available to a user through an application that enables the user to generate a query, such as by building a pattern of events from the stored event definitions. The user thus selects one or more events for an event pattern, 804, or other query. The user system generates an event query for event information, which may include real-time and historical data, 806. Such a query may be generated, for example, by an agent or user application on a client device. The query is sent to an enterprise event server, which receives the event query, 808. The enterprise event server includes an LE server as described herein.

In one embodiment, the event server parses the event query into component parts, 810. Each component part will be forwarded through the enterprise network as a separate query. The eventing system will attempt to send the query as close to the data source(s) as possible for processing. In one embodiment, the event server identifies duplicate query components, 812, or query components for the same information. Such common query components across queries may be joined to reduce network bandwidth, and improve system performance. The duplicate query components may come from other queries from the same user, other queries from other users that access the same event server, and/or other queries from other users of other event servers. In one embodiment, the event server combines the same query components into a single query, and determines how to route the single query to the data source(s), 814.

The event server sends the single query to a data source, 816, which receives the query, 818. As discussed above, the query may or may not be sent all the way to the data source, but is described as such here for purposes of simplicity in description, and not by way of limitation. The data source may process the query, 820, and return a query response, 822. In the case where the query received is a query component, the response will be to the query component, which will provide only some of the information necessary to respond to the original user query. The event server receives the response, and duplicates the response to each query source that requested the component, 824. In addition to duplicating response components to various query sources, the event server may aggregate response as described above with respect to FIG. 7. The event server returns the response to the user system, which may receive an actionable, real-time event, 826. An actionable event may allow the user to access an enterprise backend for additional information, launch actions, initiate processes, or other procedures.

Figure 9:
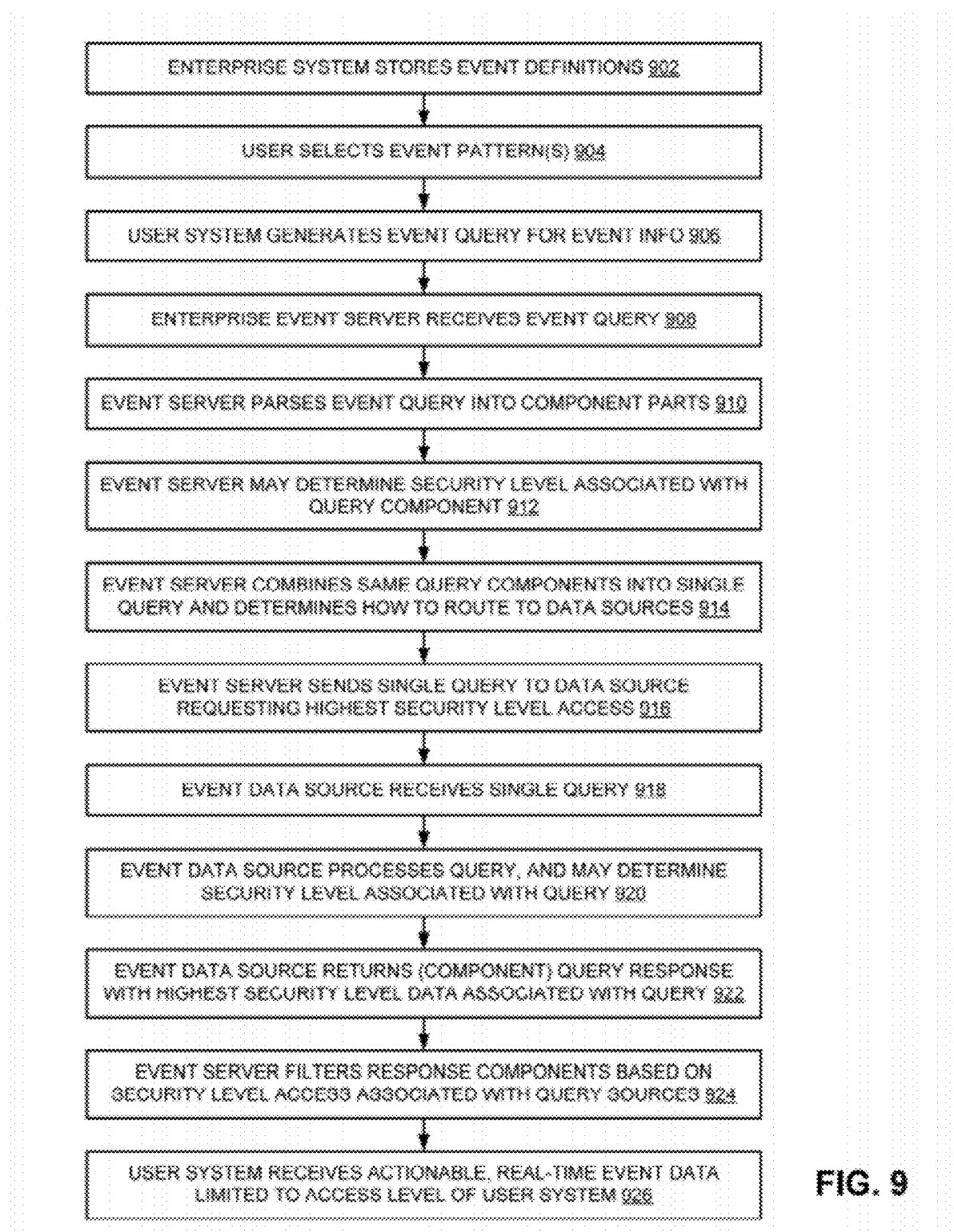
FIG. 9 is a flow diagram of an embodiment of a process for applying security to event information requests.

FIG. 9 is a flow diagram of an embodiment of a process for applying security to event information requests. In one embodiment, an enterprise system stores event definitions, 902. The user thus selects one or more events for an event pattern, 904, or other query for real-time event data within the enterprise. The user system generates an event query for event information, which may include real-time and historical data, 906. Such a query may be generated, for example, by an agent or user application on a client device. The query is sent to an enterprise event server, which receives the event query, 908. The enterprise event server includes an LE server as described herein.

In one embodiment, the event server parses the event query into component parts, 910. Each component part will be forwarded through the enterprise network as a separate query. The eventing system will attempt to send the query as close to the data source(s) as possible for processing. In addition to being able to perform operations relating to separating and aggregating query components as described above with respect to FIGS. 7 and 8, the system may also perform security operations with respect to the queries.

In one embodiment, the event server determines a level of security associated with a query component, 912. The level of security may be identified as part of the query generated by the user, or may be accessed from access tables stored in the event server. Such access tables could indicate a level of security for particular users. In one embodiment, the event server combines the same query components into a single query, and determines how to route the single query to the data source(s), 914. In one embodiment, the combined single query has a level of security associated with the highest level of security of any user requesting the data.

The event server sends the single query to a data source requesting the highest security level access, 916. The event data, or other processing entity, receives the single query, 918, and processes the query, including potentially determining the security level associated with the query, 920. In some implementations, the data source can simply return data and allow the event servers to control security. The data source returns a query response with the highest security level data associated with the query (or higher if the event servers are to handle security), 922. In the case where the query received is a query component, the response will be to the query component, which will provide only some of the information necessary to respond to the original user query. The event server receives the response, and filters the response components based on a security level access associated with each individual query source, 924. The event server returns the response to the user system, which may receive an actionable, real-time event limited to the access level of the user accessing the user system, 926. An actionable event may allow the user to access an enterprise backend for additional information, launch actions, initiate processes, or other procedures.

Figure 10:
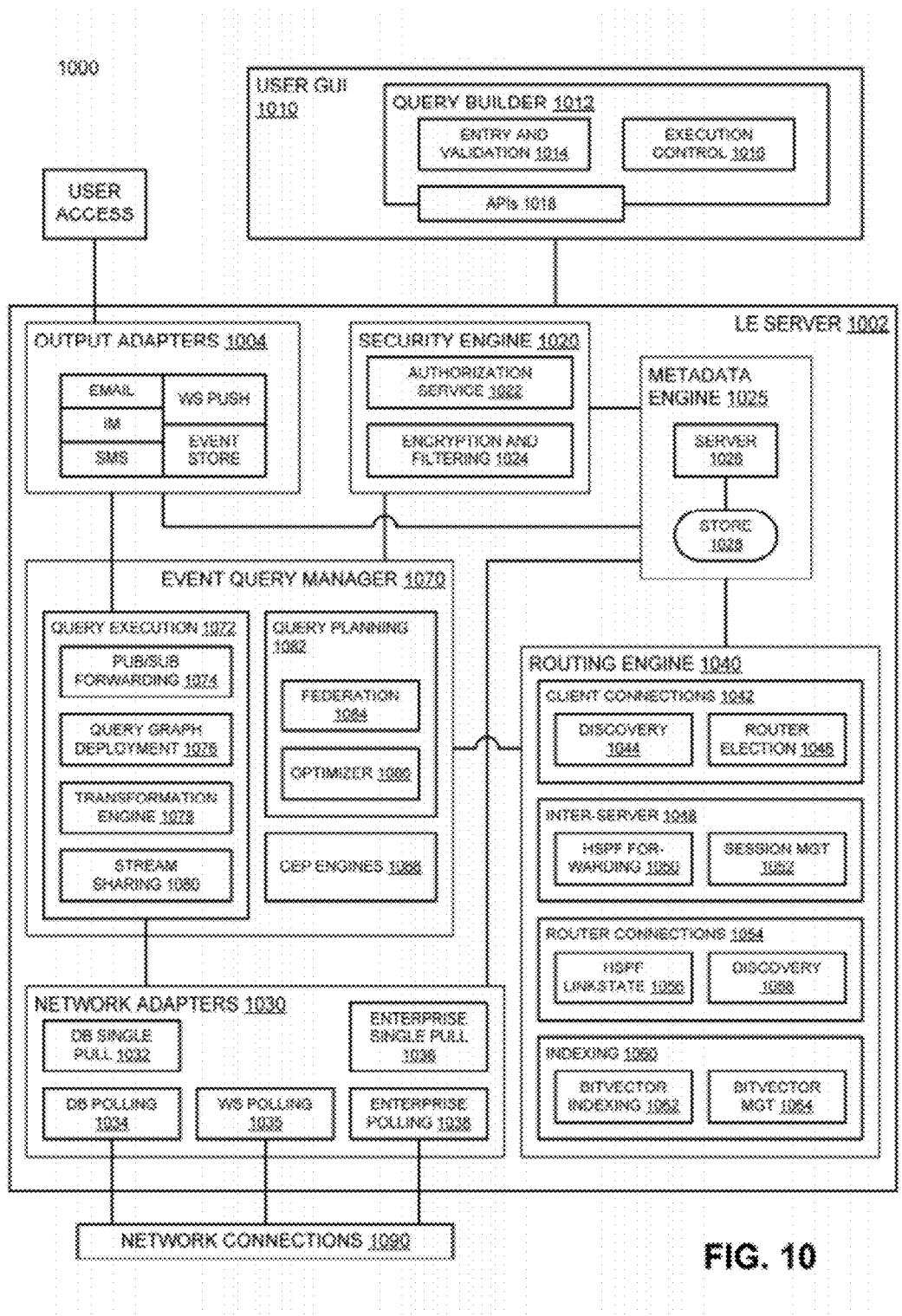
FIG. 10 is a block diagram of an embodiment of a system with an event server.

FIG. 10 is a block diagram of an embodiment of a system with an event server. System 1000 represents an enterprise system according to any embodiment described herein. System 1000 may include additional details and/or alternative implementations of an LE server and LE system.

System 1000 includes user GUI (graphical user interface) 1010, which provides a framework to build and send queries. In one embodiment, user GUI 1010 is built upon the industry-standard Eclipse GUI Framework based tool for construction, execution, and status tracking of queries. Query builder 1012 enables a user to create and validate event queries as well as to monitor event query execution. Entry and validation 1014 refers to components that enable the user to provide input. Execution control 1016 may set rules on the query and include logic for the query to be sent in the LE system.

System 1000 may include multiple APIs (application programming interfaces) that enable a user to interact with LE server 1002. APIs 1018 represent such interfaces. In one embodiment, two standard interfaces for clients exist: a Java API and a Web Service API. In one embodiment, the web service API can be implemented as a wrapper for the Java API.

LE server 1002 may include a number of components, which may include some or all of the following. Additional components could also be included. Security engine 1020 can provide security throughout the LE system. In one embodiment, security engine 1020 implements a two-level security model, enforcing security at a global LE system level and at a local data source level. At the global level, LE server 1002 can authenticate a user and enforce the user's access rights and restrictions down to the row level with authorization service 1022 (to determine security access privilege) and encryption and filtering 1024 (to enforce the security access). In one embodiment, event queries and their result sets are encrypted with a different key being used on a per query basis.

Metadata engine 1025 includes metadata server 1026 and metadata store or repository 1028. Metadata engine 1025 contains run-time and configuration information about the LE system. For instance, as an example of configuration information, metadata engine 1025 may have or contain global schema, various local schemas, as well as the various mappings between schema. The schema metadata enables the system to identify similar content even when different naming conventions for data are used. Thus, the data can be indexed for routing based on the schema, and the schema can enable the system to identify what data is available for access. In terms of run-time information, metadata engine 1025 can contain user defined event queries to indicate data the user would like to receive. It may also contain LE network topology status information, which provides information for purposes of determining routing by knowing what nodes are available.

Event query manager 1070 represents a central hub within LE server 1002 for handling eventing data. Event query manager 1070 may also be referred to as an eventing engine, and it plans event queries and coordinates the execution of the event queries.

Event query manager 1070 includes query execution 1072, which implements finalized event query plans. Event query manager 1072 may set up the paths down which the event query and results sets will flow. The query plan will be deployed amongst the underlying network adapters that connect to the data sources and other LE servers, the remote LE servers themselves, and CEP (Complex Event Processing) engines 1088. If the LE system detects that multiple users who have equivalent access rights are requesting common event data, query execution 1072 implements stream sharing to join query execution together.

Query execution 1072 includes pub/sub (publish/subscribe) forwarding 1074, which represents publish and subscribe mechanisms hosted by LE server 1002 and remote LE servers to advertise and pass data throughout the LE system. Note that query topics can be generated on the fly in an ad hoc manner, and all topics can then be accessible through the publish and subscribe mechanism. Thus, for example, query topics do not have to be predefined. Query graph deployment 1076 represents a path plan, which can include identifying what nodes are preferred paths for certain query components or query topics, and what nodes are alternate paths. In the case of common queries, one node may receive the common query components and join them. In one embodiment, the LE nodes implement an inter-node communication protocol to determine priorities and establish a query graph. The graph is not necessarily fixed at any given point in time, but can be modified dynamically within the LE system. Transformation engine 1078 enables query execution 1072 to modify or transform query components to generate queries, and transform responses to generate actionable event data. Stream sharing 1080 enables the joining of queries.

Event query manager 1070 includes query planning 1082. When a client submits an event query for processing, event query manager 1070 may first implement an execution plan. The event query is analyzed, optimized, and federated (with components such as federation service 1084 and optimizer service 186) into simpler fragments composed of individual raw event types and tables. Such a plan uses the global to local mapping information in metadata engine 1025 to determine what transformations need to be performed to generate the queries. Additionally, query planning 1082 may access index information within indexing 1058 of routing engine 1040 to determine whether the event query (or fragments, query components) are to be executed remotely at other LE servers.

In one embodiment, all event queries are executed in a publish-and-subscribe manner and event query manager 1070 acts as a hub for information flowing between the network adapters 1030, CEP engines 1088, and remote LE servers. If event information comes from a network adapter, the event information is transformed from the data source's local schema to the normalized global schema for use at LE server 1002. In one embodiment, the event query will be executed continuously until the user specifically unsubscribes.

Event query manager 1070 processes an event query, and may be able to handle the query locally at the data source or sources local to the LE server. A local data source is one that is addressable directly using a local schema. In one embodiment, a local data source is directly coupled to the LE server. In the case of data from remote LE servers, the query processing may be referred to as federated event query processing. With federated processing, the LE server may use an event federation grid to achieve fast performance. Such a grid can assume that the data sources will be distributed in a disjointed manner between several LE servers. The LE servers may or may not be in different geographic locations. Once the user defines the specific complex event pattern for the event desired, the LE server receiving the query analyzes the event and attempts to break it up into smaller and simpler pattern fragments. If more than one data source applies to an event pattern fragment, then copies of that fragment are sent to all LE servers that are connected to the applicable data sources and executed in parallel. Note that this process may be recursive. Event pattern fragments themselves may be broken up into even simpler patterns and also executed in parallel.

When the fragment's pattern is matched by the local data, then the result is sent to the LE server where the query originated. The LE server that received the query from the user collates the responses from the various fragments and performs any last-minute calculations, joins, or functions. After processing the responses, if the LE server detects that the original event pattern has been matched, the response is forwarded to the user.

Network adapters 1030 provide a framework to abstract away underlying data sources. In one embodiment, LE server 1002 includes an adapter for each data source type. Each adapter can present the same manager API to event query manager 1070, and register with the event query manager to enable to the event query manager to be aware of the data sources. Adapters can be configured as either real-time event sources (which may simply be referred to as "event sources") or historical data sources (which refers to data that is stored in a repository). Adapters may include database-type adapters, such as implemented by database single pull 1032, and database polling 1034. Such adapters can access historical data. Similar adapters may exist for enterprise system, such as implemented by enterprise single pull 1036 and enterprise polling 1038. Additionally, web service adapters may exist as shown by web service (WS) polling 1035. In one embodiment, the framework is provided as a software development kit so that new adapters can be created in a straightforward manner. Adapters may include a filtering capability that can be configured on a per-event-query basis.

Routing engine 1040 enables the routing of queries and response to queries. In one embodiment, routing engine 1040 is based on a link-state routing protocol that allows event queries and their corresponding responses to be transported multi-hop through a network from a sender to a set of destinations using a description of the receivers in the form of multiple arbitrary identifying descriptive names. Destinations can have multiple names, and these names can be acquired or removed in a dynamic fashion.

Client connections 1042 may include discovery 1044 and router election 1046. Each connection to other LE servers and other clients is discovered, as is understood in the networking arts. Additionally, each LE server can act as a event data router (referred to as an LE router) within the LE system to forward queries and responses through the LE system. As an LE router, the LE server may also engage in router election with neighboring LE servers to determine preferred paths, shortest paths to data, etc.

Inter-server connections 1048 enable forwarding between LE servers. In one embodiment, inter-server connections 1048 implements a Hierarchical Shortest-Path First (HSPF) protocol. With HSPF, each LE router has a routing table entry for each destination in the network. Each entry contains information on a destination's event and data content, IP address, and the shortest path to the destination. The destination for a message is defined as the event or data content that is sought. When forwarding a message, an LE router uses its routing table information to determine the specific final destinations that contain that event or data content and then forwards the message on the shortest path to those destinations. Because the destinations for a message are described using event or data content, this allows for a decoupling of event consumers and event producers, which, in turn, allows for new destinations, locations, or companies, to be added quickly in an uncoordinated fashion and without requiring that the system be reprogrammed in any way.

From one perspective, HSPF can be considered a variation of the standard Internet link-state routing protocol Open Shortest-Path First (OSPF). Use of a protocol having similarities to OSPF allows LE to have the following advantages: 1) automatically discover nearby LE servers and create connections between them using the OSPF HELO protocol; 2) dynamically distribute network knowledge throughout the LE topology; 3) dynamically adjust to network topology changes, such as server connections going down; 4) use of router election protocols to enable each location to have a primary LE server and a "hot stand-by" in case of a failure of the primary server; and, 5) use of hierarchical routing to scale to large numbers of destinations and to hide the organization of different hierarchy areas from each other (such as when different areas correspond to different companies).

However, HSPF, as being based on OSPF has limitations. For instance, OSPF is a logical protocol that only understands network links and the computer nodes on those links and has no knowledge of the enterprise event and data content on them. HSPF extends OSPF by inserting content information in the LE system in the form of bit vectors into the routing tables so that the LE routers understand the enterprise data that is available on those networks and computer nodes. Also, OSPF only allows two levels of hierarchy, which limits it to a theoretical maximum of 200 companies and 4000 destination computer nodes. HSPF extends OSPF further to enable an arbitrary number of hierarchical levels to reach many thousands of companies and destinations. The OSPF HELO protocol only creates automatic connections between routers. HSPF implements a variation of the HELO protocol to automatically detect and connect routing clients.

Once a message has been forwarded all of the way from the sender to all of the destinations, the routers will have created a one-to-many shortest-path routing tree with the "root" at the sender and the "leaves" at all of the destinations. Such a routing tree is called a session and soft-state at each router, in the form of a routing cached, and is used to maintain and manage a record of this session. Because probabilistic equations are used for the indexing for engineering trade-off reasons, false positives may result during the forwarding phase. Final checks at the destinations are performed and, if false positives are detected, those routing paths may be pruned as a result.

In accordance with the above, inter-server connections 1048 include HSPF forwarding 1050, and session management 1052. HSPF forwarding is routing in accordance with the HSPF protocol. Session management 1052 implements the session and soft-state principles mentioned above. Also in accordance with the above, router connections 1054 implements the connections to other LE servers as routers for event data. HSPF linkstate 1056 indicates the link state of neighboring LE servers. Discovery 1058 enables a router to discover other routers and a shortest path to a data source.

Indexing 1058 allows the use of the indexing mentioned above, through which routing can be implemented. In LE routing, the system is designed to allow computer hosts to have multiple descriptive names, such as the event types that they offer. Furthermore, these names or characteristics can be acquired or removed by a host in a dynamic fashion with little overhead. Using hash-based probabilistic equations, these names are encoded into bit vectors to implement bitvector indexing 1062. Bitvector indexing 1062 allows bit vectors to encode only the existence of the descriptive names. Because only existence information is stored, compression ratios of 200:1 have been achieved. The bit vectors can then be managed by bitvector management 1064 using standard vector mathematics to easily merge, compare, and normalize their vector lengths.

Output adapters 1004 are designed to give multiple options for forwarding results for user access. Result sets can be sent directly to an application via a web service, stored for later perusal in an event store, and sent directly to a user via email, instant messaging, or SMS. In one embodiment, LE server 1002 monitors a user's online presence determine the right output adapter to use accordingly.

The LE system as described herein is designed to be deployed in a single location, multiple locations, and/or in multiple companies. Single location deployment involves deployment on a single physical server (typically) or on multiple physical servers. Deployment of the various LE system components can be performed, for example, by implementing the LE in Java, and having a Java runtime engine installed on the server. Multiple location deployment involves installation of at least part of the LE system components, but all LE system components are not needed at each location. An administrator could push only the necessary components to the different locations. In a multiple location scenario, the individual components are designed to automatically discover each other and establish connections between each other. In one embodiment, the servers should be on the same LAN subnet for the individual components to find each other. Alternatively the servers can be specifically configured to connect to each other.

Additionally, multiple company deployment is possible by implementing a multi-location scenario across firewalls between the companies. In one implementation, a secure point-to-point connection is established across the firewalls, while in another implementation, a trusted third party enables the connection. The two companies can create a secure point-to-point connection, such as a VPN tunnel, between the two companies. The LE installations within each company can then be joined together by connecting their network routers. Since LE system routers are able to route multi-hop between them, it is possible to route event queries and result sets through a trusted third party. In this case, the third party at least enabled as an LE router by the LE system components necessary to implement the LE router (e.g., routing engine 1040). Both companies would then make secure connections to the third party and connect their LE system routers to the third party's LE router.

Figure 11:
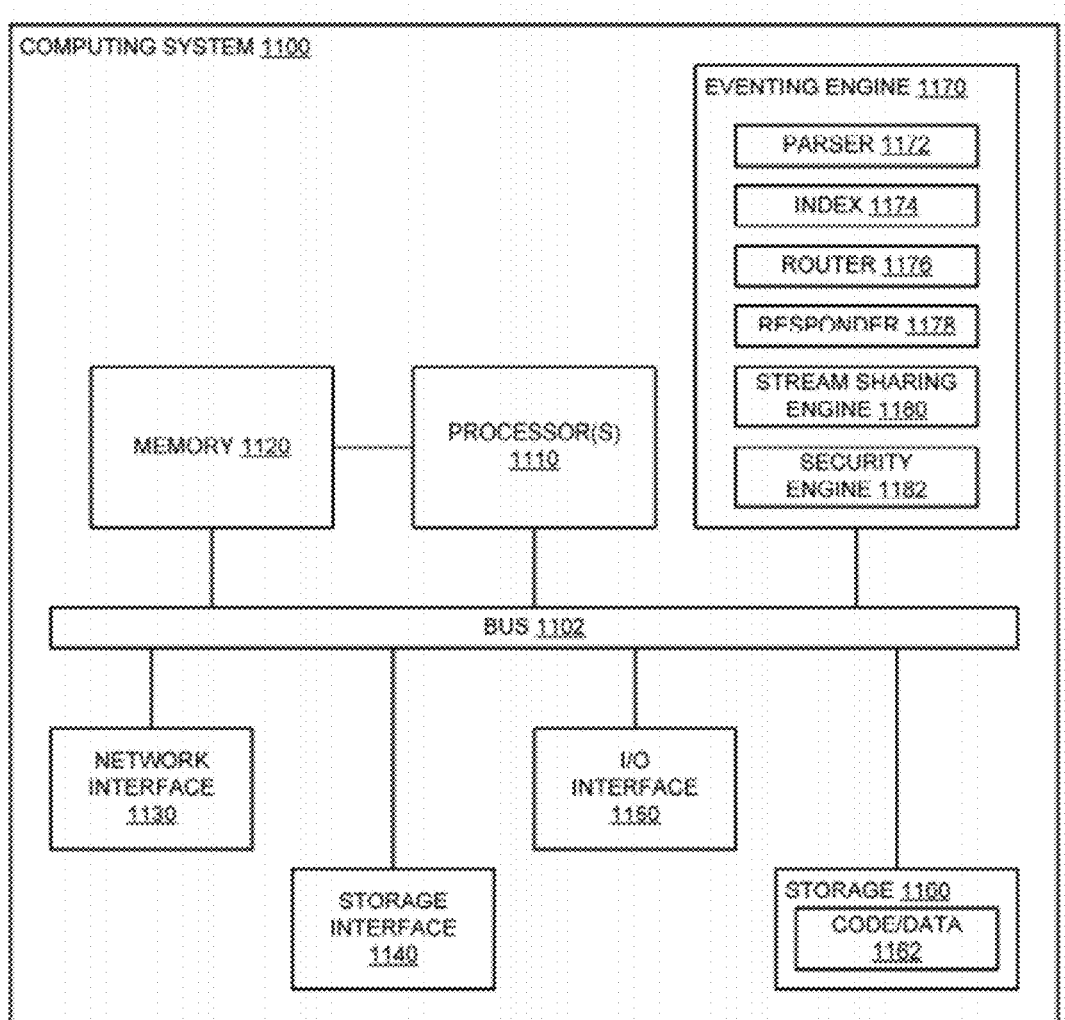
FIG. 11 is a block diagram of an embodiment of a computing system on which embodiments of the invention can be implemented.

FIG. 11 is a block diagram of a computing system on which embodiments of the invention can be implemented. Computing system 1100 represents hardware that might execute one or more event server nodes, or LE nodes as described herein. Computing system 1100 is depicted with various components that may be present in whole or in part, and additional components or subcomponents may also be present. Computing system 1100 includes one or more processors 1110, which executes instructions and may perform various operations as described herein. Processor 1110 may include any type of microprocessor, central processing unit (CPU), processing core, etc. Processor 1110 controls the overall operation of the computing system 1100, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 1120 represents the main memory of the computing system 1100, and provides temporary storage for code (e.g., software routines or series of instructions, commands, operations, programs, data, etc.) to be executed by processor 1110. Memory 1120 may include read-only memory (ROM), flash memory, one or more varieties of random access memory (RAM), or the like, or a combination of such devices. Memory 1120 stores data and instructions for performing operations, including interacting with user clients, data sources, and/or other event server nodes.

The various components of computing system 1100 are coupled to bus 1102. Bus 1102 is an abstraction that represents any one or more separate physical buses, communication lines, and/or point-to-point connections, connected by appropriate bridges, adapters, and/or controllers. Therefore, bus 1102 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Computing system 1100 includes network interface 1130, which represents hardware and software (e.g., drivers) that enable computing system 1100 to communicate with remote devices (e.g., clients, data sources, and/or other event server nodes) over one or more networks. Processor 1110 may execute various network stacks to control interfaces to various networks through network interface 1130. Computing system 1100 may include storage interface/adapter 1140, which enables computing system 1100 to access attached storage (e.g., a storage area network or other storage subsystem) and may be, for example, a Fibre Channel adapter, a SCSI adapter, etc. Computing system 1100 includes one or more input/output (I/O) interface(s) 1150, which may include one or more interface components to connect with other electronic equipment, for example, custom connections, blade adapters, etc. Additionally, I/O interfaces 1150 can include video, audio, and/or alphanumeric interfaces through which a user interacts with computing system 1100. Computing system 1100 may include one or more internal storage device(s) 1160. Storage 1160 can be any conventional medium for storing large volumes of data in a non-volatile manner, such as magnetic, optical, and/or semiconductor-based disks. Storage 1160 may hold code and/or data 1162 in a persistent state (i.e., the value may be retained despite interruption of power to computing system 1100).

Computing system 1100 includes eventing engine 1170, which is an abstraction to represent components (software and/or hardware) that enable computing system 1100 to participate in an eventing system as described herein. Note that eventing engine 1170 may be an instance of an LE server node, and other instances could also be executed on the same hardware. That is, while certain hardware elements are necessary for the execution of an LE server node, that hardware may be shared with other LE nodes, and/or other enterprise server nodes, or other enterprise systems.

Parser 1172 enables eventing engine 1170 to parse queries into component parts. Index 1174 provides routing information for eventing engine to identify data sources. Router 1176 enables eventing engine 1170 to route the queries to the identified data sources, including determining a path in the network, and identifying other LE server nodes. Responder 1178 enables eventing engine 1170 to generate responses to the queries based on the response components received from the data sources. Stream sharing engine 1180 enables eventing engine 1170 to implement stream sharing to combine duplicate query components into a single stream, as described herein. Security engine 1182 enables eventing engine 1170 to implement security on the query components, and combine and maintain security access for queries generated by users with different access privileges.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:
1. A computer-implemented method comprising:
receiving a query requesting information about an event in an enterprise system having multiple separate event data sources distributed among separate enterprise nodes, the receiving via a query routing node of the enterprise system, where the event includes a change in one or more structured data objects, the data sources being separate enterprise subsystems that generate the changes;
parsing the query into component parts, where each component part relates to an item of information about the event needed to respond to the query as a whole, each component part is separately answerable by a different response from a data source, and where at least two component parts are related to events from data sources at different enterprise nodes;
sending each component part to be routed to an enterprise node local to, and associated with, a data source advertised in the enterprise system as a source of the item of information;
receiving responses to component parts from the separate enterprise nodes, at least one response including information about the event from the data source associated with each enterprise node, and not from a data warehouse that aggregates event information; and
combining the responses to generate an event query response indicating a change of data at a data source.

2. The method of claim 1, wherein receiving the query comprises:
receiving a request to monitor a real-time stream of event data for a pattern of events, where the event data includes information about changes to one or more objects.

3. The method of claim 2, wherein combining the responses to generate the event query response further comprises:
processing the responses to selectively combine the responses to generate an actionable event that enables a user to react to the received responses about the pattern of events.

4. The method of claim 1, wherein receiving the query comprises receiving the query at an event server of a first enterprise subsystem, and wherein sending each component part to a data source comprises sending a component part to a second enterprise subsystem separate from the first enterprise subsystem.

5. The method of claim 1, wherein receiving the query comprises receiving a query component as previously parsed by another network node, where the query component is part of a larger query of a user; and wherein parsing the query further comprises parsing the received query component into multiple sub-component parts, each requesting different items of information.

6. The method of claim 1, wherein sending each component part to a data source comprises:
duplicating at least one component part and sending the one component part to two or more data sources within the enterprise system.

7. The method of claim 1, wherein sending each component part to a data source comprises:
sending each component based on an event data index that indicates location and content of event data within the enterprise system.

8. The method of claim 1, wherein sending each component part to a data source comprises:
subscribing to a data stream of the data source, where the data stream provides information about the component part.

9. The method of claim 1, wherein the data source comprises:
one or more of a customer resource management (CRM) system, an enterprise resource planning (ERP) system, a database, or a flat file.

10. The method of claim 1, wherein receiving the response further comprises:
receiving at least one response including historical data from a data warehouse.

11. The method of claim 1, wherein the query is received, parsed and sent prior to a data change at the data source.

12. The method of claim 1, wherein the event comprises a structural change event indicating a structural change in a business process.

13. A non-transitory machine readable storage medium having content stored thereon to provide instructions, which when executed, cause a processor of an enterprise system node to perform operations, including:
receiving a query requesting information about an event in an enterprise system having multiple separate event data sources distributed among separate enterprise nodes, the receiving via routing node of the enterprise system, where the event includes a change in one or more structured data objects, the data sources being separate enterprise subsystems that generate the changes;
parsing the query into component parts, where each component part relates to an item of information about the event needed to respond to the query as a whole, each component part is separately answerable by a different response from a data source, and where at least two query components are related to events from data sources at different enterprise nodes;
sending each component part to be routed to an enterprise node local to, and associated with, a data source advertised in the enterprise system as a source of the item of information;
receiving responses to component parts from the separate enterprise nodes, at least one response including real-time information about the event from the data source associated with each enterprise node and not from a data warehouse that aggregates event information; and
combining the responses to generate an event query response indicating a change of data at a data source.

14. The machine readable storage medium of claim 13, wherein the content to provide instructions for receiving the query comprises content to provide instructions for
receiving a request to monitor a real-time stream of event data for a pattern of events, where the event data includes information about changes to one or more objects.

15. The machine readable storage medium of claim 13, wherein the content to provide instructions for combining the responses to generate the event query response further comprises content to provide instructions for
processing the responses to selectively combine the responses to generate an action responsive to the event.

16. The machine readable storage medium of claim 13, wherein the content to provide instructions for or receiving the query comprises content to provide instructions for receiving the query at an event server of a first enterprise subsystem, and wherein the content to provide instructions for sending each component part to a data source comprises content to provide instructions for sending a component part over a public network to a second enterprise subsystem separate from the first enterprise subsystem.

17. The machine readable storage medium of claim 13, wherein the content to provide instructions for sending each component part to a data source comprises content to provide instructions for
duplicating at least one component part and sending the one component part to two or more data sources within the enterprise system.

18. The machine readable storage medium of claim 13, wherein the content to provide instructions for sending each component part to an event data source comprises content to provide instructions for
sending each component based on a business event data index that indicates location and content of business event data within the enterprise system.

19. The machine readable storage medium of claim 13, wherein the content to provide instructions for sending each component part to an event data source comprises content to provide instructions for
subscribing to a data stream of the event data source, where the data stream provides information about the component part.

20. A server node of an enterprise network, comprising:
a network interface circuit to receive a query requesting information about an event in an enterprise system having multiple separate data sources distributed among separate enterprise nodes, the receiving via a query routing node of the enterprise system, where the event includes a change in one or more structured data objects, the data sources being separate enterprise subsystems that generate the changes;
a query parser to parse the query into component parts, where each component part relates to an item of information about the event, each component part is separately answerable by a different response from a data source, and where at least two query components are related to events from data sources at different enterprise nodes;
a query router to send each component part to be routed to an enterprise node local to, and associated with, a data source advertised as generating the item of information, and receive responses to component parts from the separate enterprise nodes, at least one response including real-time information about the event from the data source associated with each enterprise node and not from a data warehouse that aggregates event information; and
a query responder to combine the responses to generate an event query response indicating a change of data at a data source.

21. The server node of claim 20, wherein the parser receives a request to monitor a real-time stream of event data for a pattern of events, where the event data includes information about changes to one or more objects.

22. The server node of claim 20, wherein the parser receives a query component as previously parsed by another network node, where the query component is part of a larger query of a user; and wherein parsing the query further comprises parsing the received query component into multiple sub-component parts, each requesting different items of information.

23. The server node of claim 20, wherein the query router sends a component part to a node that is a next hop in an event network path to a node directly coupled to a data source, through which the data source is accessible to the event network.

* * * * *